United States Patent [19]
Nishimore et al.

[11] Patent Number: 5,147,008
[45] Date of Patent: Sep. 15, 1992

[54] FOUR-WHEEL VEHICLE STEERING APPARATUS

[75] Inventors: Masayoshi Nishimore, Okazaki; Hiroshi Yoshida, Toyokawa; Masanori Tani, Okazaki; Tadao Tanaka, Okazaki; Hiroshi Fujii, Okazaki; Hiroyuki Masuda, Okazaki, all of Japan

[73] Assignees: Mitsubishi Jidosha Kogyo Kabushiki Kaisha; Mitsubishi Jidosha Engineering Kabushiki Kaisha, both of Tokyo, Japan

[21] Appl. No.: 425,598

[22] Filed: Oct. 23, 1989

[30] Foreign Application Priority Data

| Oct. 31, 1988 | [JP] | Japan | 63-275648 |
| Oct. 31, 1988 | [JP] | Japan | 63-275649 |
| Oct. 31, 1988 | [JP] | Japan | 63-275650 |
| Oct. 31, 1988 | [JP] | Japan | 63-275652 |

[51] Int. Cl.$^5$ .................. B62D 5/06; B62D 5/087; B62D 7/14
[52] U.S. Cl. ................... 180/140; 180/141; 180/143; 280/91
[58] Field of Search .............. 180/140, 79, 79.1, 141, 180/143; 280/91

[56] References Cited

U.S. PATENT DOCUMENTS

| 4,730,839 | 3/1988 | Miyoshi | 280/91 |
| 4,781,262 | 11/1988 | Nakamura et al. | 180/140 |
| 4,811,805 | 3/1989 | Yoshida et al. | 280/91 |
| 4,917,205 | 4/1990 | Kobayashi et al. | 180/140 |

FOREIGN PATENT DOCUMENTS

| 0199347 | 10/1986 | European Pat. Off. |
| 59-186773 | 10/1984 | Japan |
| 62-191272 | 8/1987 | Japan |

*Primary Examiner*—Mitchell J. Hill
*Attorney, Agent, or Firm*—Hedman, Gibson & Costigan

[57] ABSTRACT

A four-wheel steering apparatus for a vehicle includes a hydraulic actuator for steering the rear wheels, and first and second oil pumps. An in-phase steering control valve is connected between the first oil pump and the actuator and outputs first hydraulic output for steering the rear wheels in phase with the front wheels in accordance with a steering state of the front wheels. An antiphase steering control valve is connected between the second oil pump and the actuator and outputs second hydraulic output for steering the rear wheels in opposite phase to the front wheels in accordance with a rate of change in the steering state of the front wheels. The hydraulic actuator combines the first and second hydraulic outputs from the control valves and steers the rear wheels in accordance with the difference between the hydraulic outputs.

24 Claims, 20 Drawing Sheets

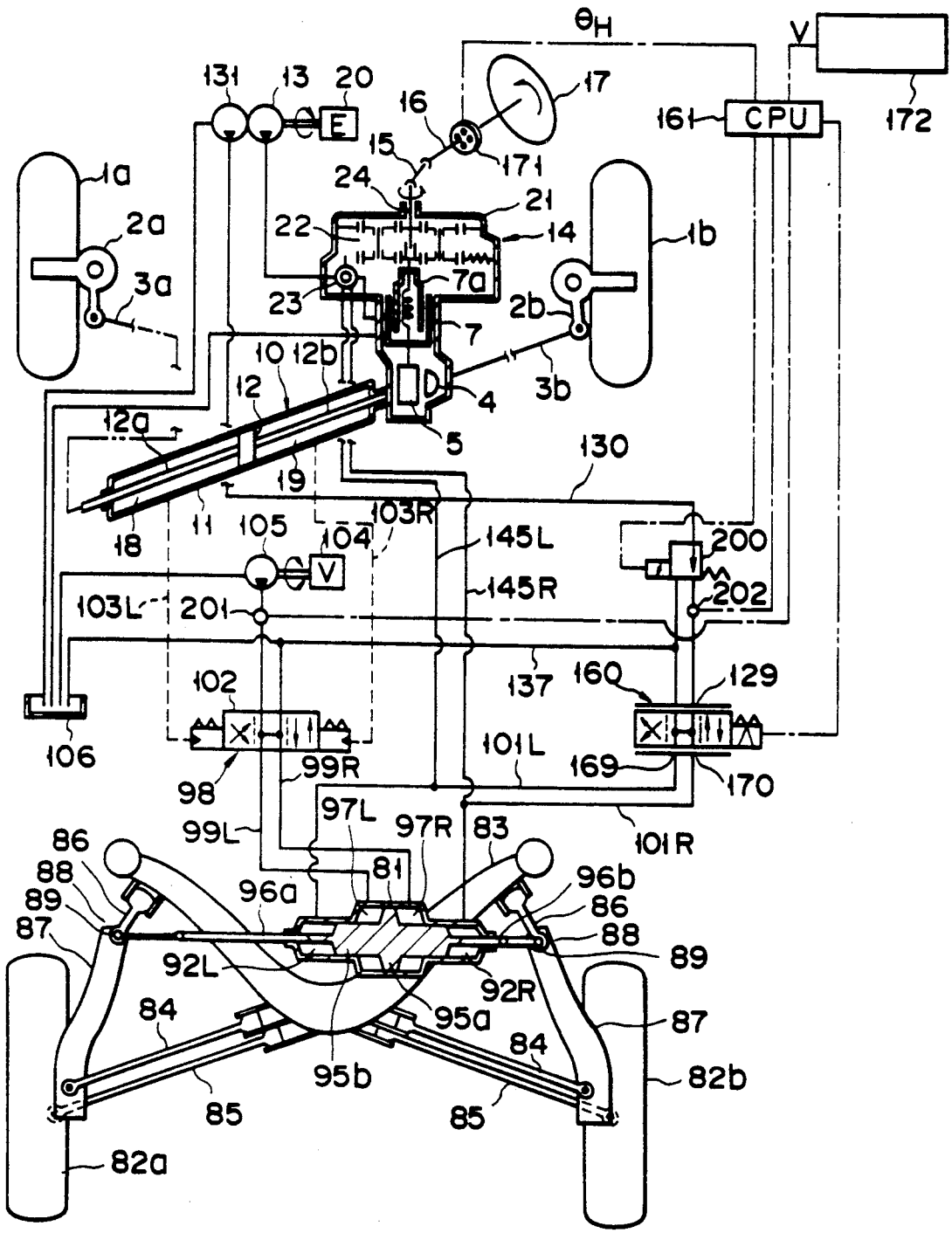
F I G. 18

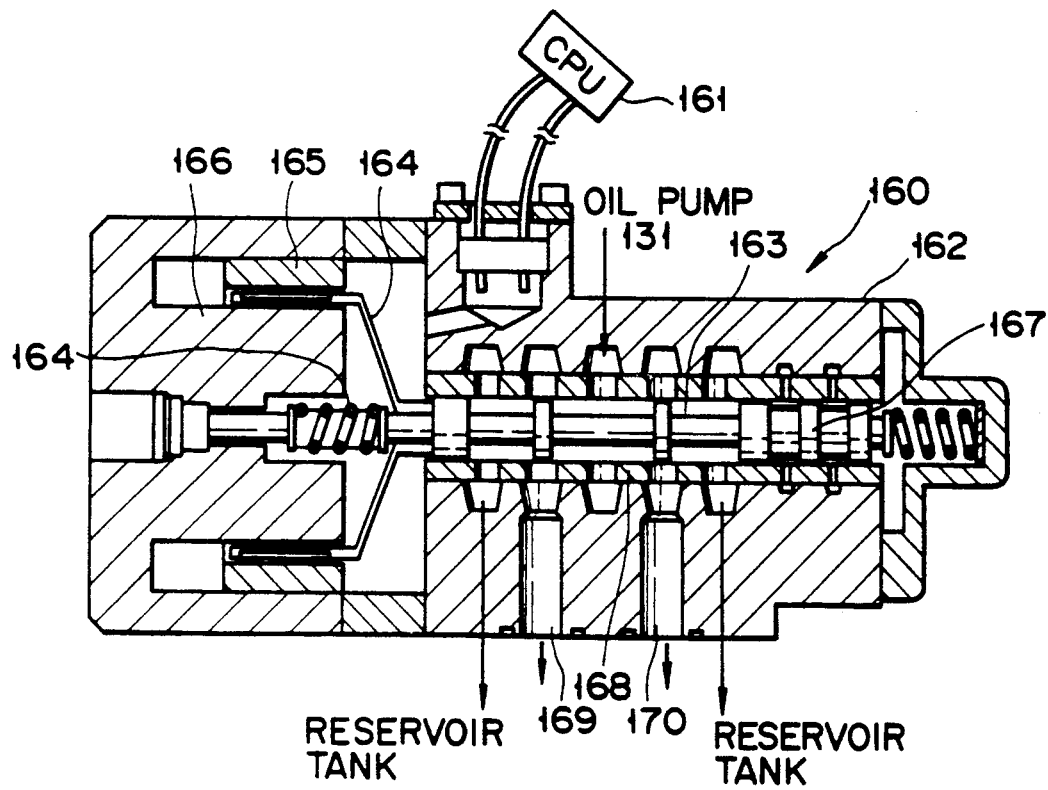
F I G. 19.
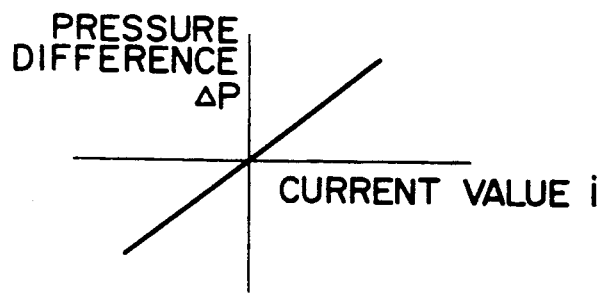
F I G. 20

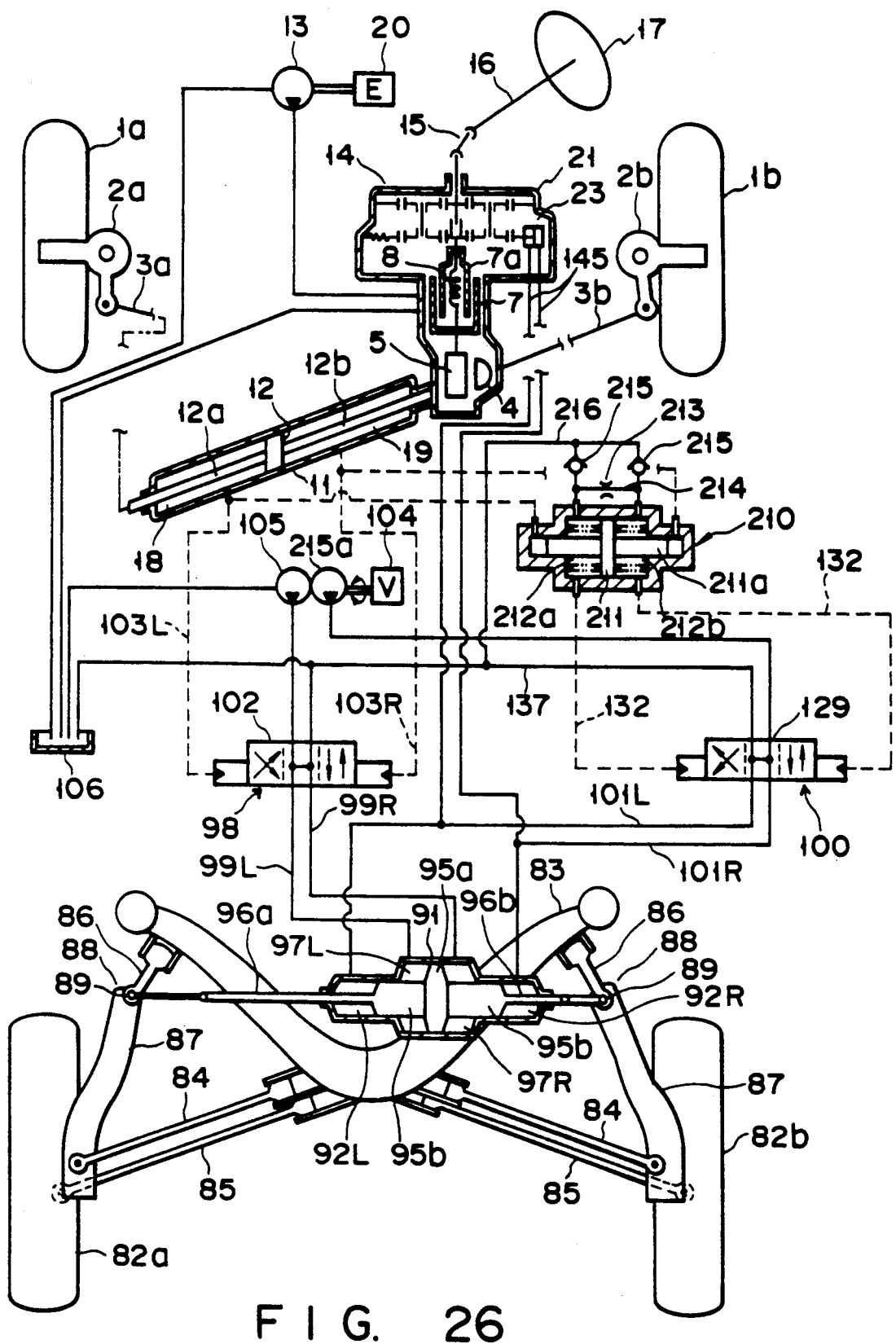
F I G. 26

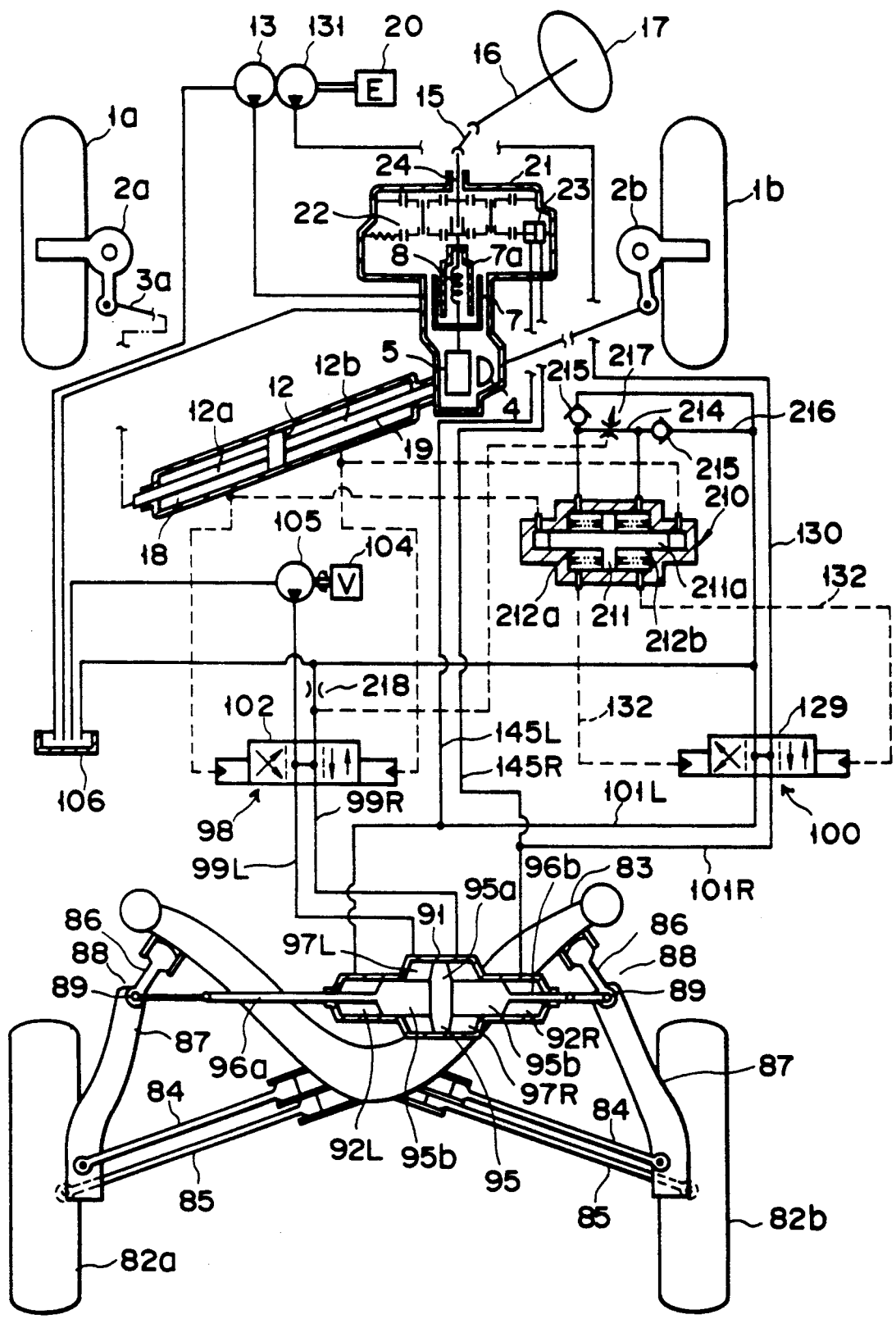
F I G. 27

FOUR-WHEEL VEHICLE STEERING APPARATUS

BACKGROUND OF THE INVENTION

1. Field of the Invention

The present invention relates to a four-wheel steering apparatus for a vehicle, capable of steering front and rear wheels.

2. Description of the Related Art

In recent years, a four-wheel steering apparatus has become popular. With this apparatus, the rear wheels are steered in phase with the front wheels during high- and middle-speed traveling of a vehicle to cause the rear wheels to positively generate a cornering force, thereby improving driving stability during turning of the vehicle.

However, when in-phase steering control described above is performed, a yaw response at the start of turning of the vehicle is delayed to result in under-steering. In order to solve this problem, as disclosed in Published Unexamined Japanese Patent Application Nos. 59-186773 and 62-191272, there are known four-wheel steering apparatuses wherein rear wheels are temporarily steered in opposite phase to front wheels at the initial period of turning of the vehicle to assure a good yaw response of the vehicle and then the rear wheels are steered in phase with the front wheels to assure stability during turning of the vehicle. In each of these prior art four-wheel steering apparatuses, a rear-wheel steering mechanism is controlled in accordance with an output from a single steering control means. The rear wheels are temporarily steered in opposite phase to the front wheels at the start of steering, and then the phase is reversed to steer the rear wheels in phase with the front wheels.

When the above-mentioned phase reverse is performed by the single steering control means as in the conventional apparatuses, control is undesirably complicated, and it is difficult to sufficiently assure good response characteristics at the time of phase reverse.

The conventional four-wheel steering apparatus described in Published Unexamined Japanese Patent Application No. 59-186773 is designed to reverse the phase of the rear wheels when a predetermined period of time from the start of steering has elapsed. It is, however, difficult to set the predetermined period of time so as to satisfy both turning characteristics of the vehicle and convergence of the control.

The conventional four-wheel steering apparatus described in Published Unexamined Japanese Patent Application No. 62-191272 detects a turning operation and turning convergence to perform phase reverse of the rear wheels. However, when the steering wheel is returned, the phase of the rear wheels is reversed, and the vehicle behavior is abruptly changed. For this reason, the steering feel is spoiled, and passengers may feel uneasiness.

SUMMARY OF THE INVENTION

It is an object of the present invention to provide a four-wheel steering apparatus for a vehicle, capable of obtaining good response characteristics and performing appropriate phase reverse control of rear-wheel steering by simple control.

This object can be achieved by a four-wheel steering apparatus having in-phase steering control means and antiphase steering control means arranged in tandem therewith. The four-wheel steering apparatus comprises in-phase steering control means for generating a hydraulic output for steering rear wheels in the same direction as that of front wheels in accordance with a steering state of the front wheels, antiphase steering control means, arranged in parallel to the in-phase steering control means, for generating a hydraulic output for steering the rear wheels in a direction opposite to that of the front wheels in accordance with a rate of change in steering state of the front wheels, and an hydraulic actuator for combining the hydraulic outputs from the in-phase and antiphase steering control means to steer the rear wheels.

According to the present invention, the in-phase steering control means is arranged in tandem with the antiphase steering control means, and the hydraulic outputs from these means are combined to determine a steering angle of the rear wheels. Therefore, the steering direction of the rear wheels is determined by hydraulic output conditions of these means. Thus, a phase reverse signal for reversing the steering direction of the rear wheels is not required to simplify control, and at the same time, a smooth operation having good response characteristics can be obtained.

Since the in-phase steering control means is arranged in tandem with the antiphase steering control means, a four-wheel steering apparatus capable of performing phase reverse control of the rear wheels can be relatively easily realized at low cost, by using a conventional four-wheel steering apparatus of an in-phase steering type.

In addition, the in-phase steering control means performs control corresponding to a steering state of the front wheels, whereas the antiphase steering control means performs control corresponding to a rate of change in steering state of the front wheels. Therefore, in the initial period of turning of the vehicle, the hydraulic output from the antiphase steering control means efficiently acts on the actuator means prior to the hydraulic output of the in-phase steering control means, and the rear wheels can be temporarily steered in opposite phase to the front wheels. Thereafter, in normal turning, since the rate of change in steering state of the front wheels decreases, the hydraulic output of the antiphase steering control means is decreased. At the same time, the in-phase steering control means generates a hydraulic output corresponding to the steering state of the front wheels. Therefore, the rear wheels are steered in phase with the front wheels, and turning stability of the vehicle can be assured.

According to a preferred embodiment of the present invention, the antiphase steering control means is constructed so as to increase its hydraulic output in accordance with a rate of change in hydraulic pressure generated by a front-wheel power steering unit, and the in-phase steering control means is constructed so as to increase its hydraulic output in accordance with hydraulic pressure generated by the front-wheel power steering unit. Therefore, rear-wheel steering can be achieved by hydraulic control without using electronic control, thereby improving reliability and durability of the apparatus.

According to another preferred embodiment of the present invention, the in-phase and antiphase steering control means are arranged to increase a ratio of the hydraulic output from the in-phase steering control means to that from the antiphase steering control means in proportion to increase of the vehicle speed. Therefore, as the vehicle speed increases, a steering amount of the rear wheels in an opposite direction in the initial period of turning of the vehicle is decreased, thereby obtaining appropriate steering characteristics according to vehicle speed.

According to still another preferred embodiment of the present invention, there is further provided a phase-advancing steering mechanism for increasing a steering angle of the front wheels. The phase-advancing steering mechanism is driven to increase the steering angle of the front wheels in accordance with the hydraulic output from the antiphase steering control means. Therefore, the yaw response characteristics can be further improved without impairing stability of the vehicle. In addition, phase-advancing steering and temporary antiphase steering of the rear wheels are commonly controlled. Thus, the front- and rear-wheel control balance for improving the yaw response characteristics can be easily maintained to be constant, thereby improving reliability.

BRIEF DESCRIPTION OF THE DRAWINGS

FIGS. 1 to 14 show a four-wheel steering apparatus according to a first embodiment of the present invention, in which FIG. 1 is a view showing an overall arrangement of the four-wheel steering apparatus;

FIG. 2 is a sectional view showing an in-phase steering control valve;

FIG. 3 is a sectional view showing an antiphase control valve;

FIG. 4 is a schematic view showing the antiphase control valve;

FIG. 5 is a partially cutaway perspective view showing a phase-advancing mechanism;

FIG. 6 is a sectional view showing members around two planetary gear mechanisms;

FIG. 7 is a sectional view showing a structure of a control valve in the phase-advancing mechanism;

FIG. 8 is a graph showing characteristics of an oil pump of a constant flow rate type driven by an engine;

FIG. 9 is a graph showing characteristics of a pilot pressure generated by a vehicle speed response pressure generator;

FIG. 10 is a graph showing phase-advancing control;

FIG. 11 is a graph showing phase control;

FIG. 12 is a graph showing a composite force in phase control;

FIG. 13 is a block diagram showing a control form between phase-advancing control and phase control; and FIG. 14 is a graph showing a state wherein phase-advancing control and phase control are performed at both counterclockwise and clockwise steering angles;

FIG. 18 is a view showing a main part according to a third embodiment of the present invention;

FIG. 19 is a sectional view showing a pressure feedback servo valve;

FIG. 20 is a graph showing the characteristics of the pressure feedback servo valve;

FIG. 26 is a view showing a main part according to a sixth embodiment of the present invention; and FIG. 27 is a view showing a main part according to a seventh embodiment of the present invention.

DETAILED DESCRIPTION OF THE PREFERRED EMBODIMENTS

Figure 1:
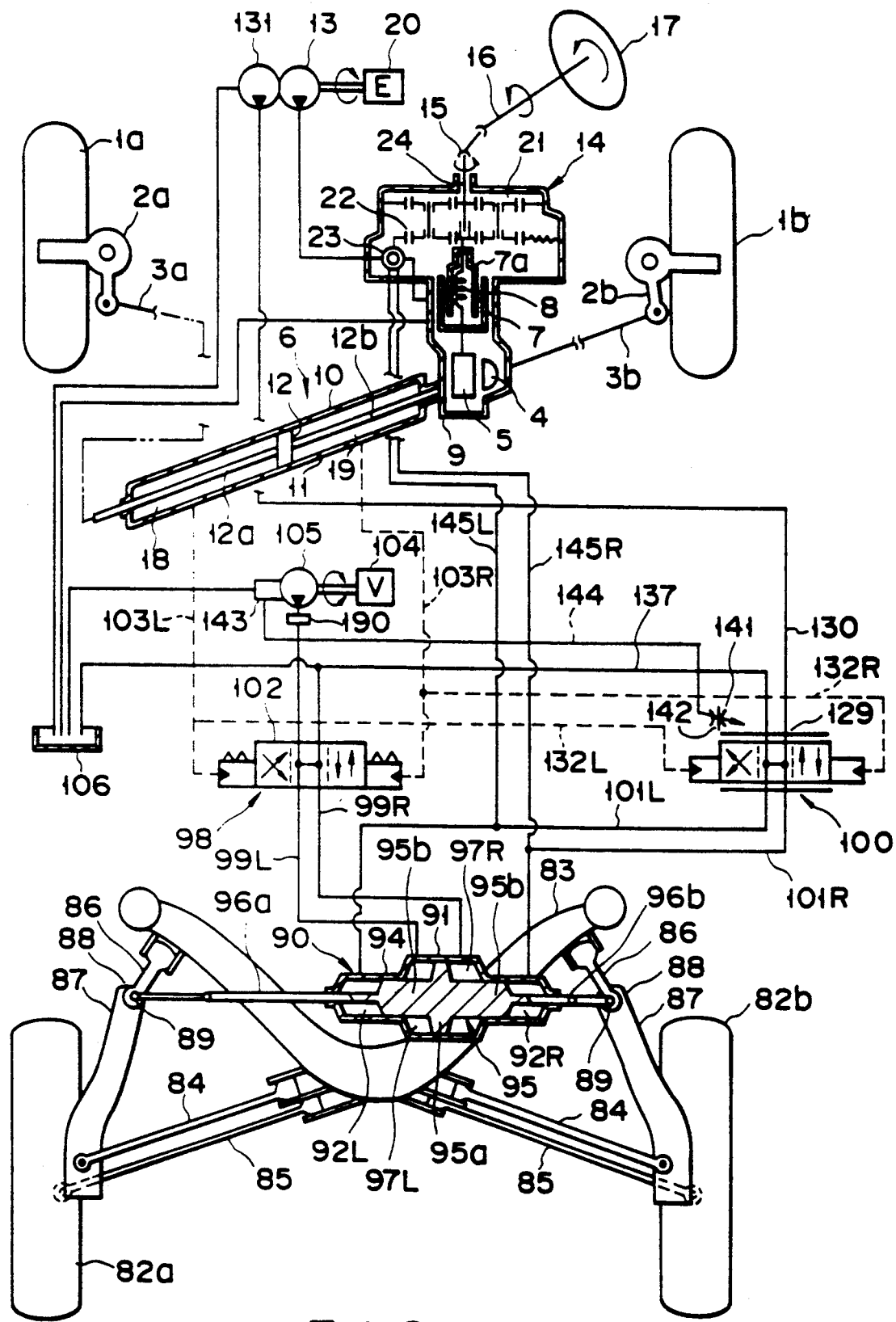

The present invention will be described with reference to a first embodiment shown in FIGS. 1 to 14. FIG. 1 shows a four-wheel steering apparatus for a vehicle. Reference numerals 1a and 1b denote left and right front wheels. The front wheels 1a and 1b are rotatably supported by knuckle arms 2a and 2b which are supported by a vehicle body (not shown) to be swingable with respect to a horizontal plane. The knuckle arms 2a and 2b are connected to a power cylinder 10 of a power steering unit 6 through tie rods 3a and 3b. The power cylinder 10 comprises a cylinder 11, a piston 12 for partitioning the interior of the cylinder 11 into left and right pressure chambers 18 and 19, and piston rods 12a and 12b extending from both ends of the cylinder 11 to the outside thereof. The tie rods 3a and 3b are respectively connected to the piston rods 12a and 12b. The piston rod 12b has a rack 4 which is meshed with a pinion 5 located in a steering gear box 9.

A steering wheel 17 is connected to a valve input shaft 7a of a rotary valve 7, which is connected to the pinion 5 of the steering gear box 9, and a torsion bar 8 through a phase-advancing mechanism 14 (to be described later), an intermediate joint 15, and a column shaft 16. The rotary valve 7 is connected to an oil pump 13, a reservoir tank 106, and the power cylinder 10 through a pipe. The rotary valve 7 controls pressure supplied to the power cylinder 10. When the steering wheel 17 is operated, the rack 4 is moved in the same direction as the steering direction of the steering wheel 17 through the torsion bar 8. At the same time, hydraulic pressures corresponding to a torsion amount of the torsion bar 8 are supplied to the left and right chambers 18 and 19 formed at both sides of the piston 12 through the rotary valve 7, thereby assisting the steering force of the steering wheel 17. The oil pump 13 for the power steering unit 6 is driven by an engine 20. The oil pump 13 has characteristics for decreasing a delivery flow rate with an increase in engine speed after a speed of the engine 20 exceeds a predetermined value.

Figure 5:
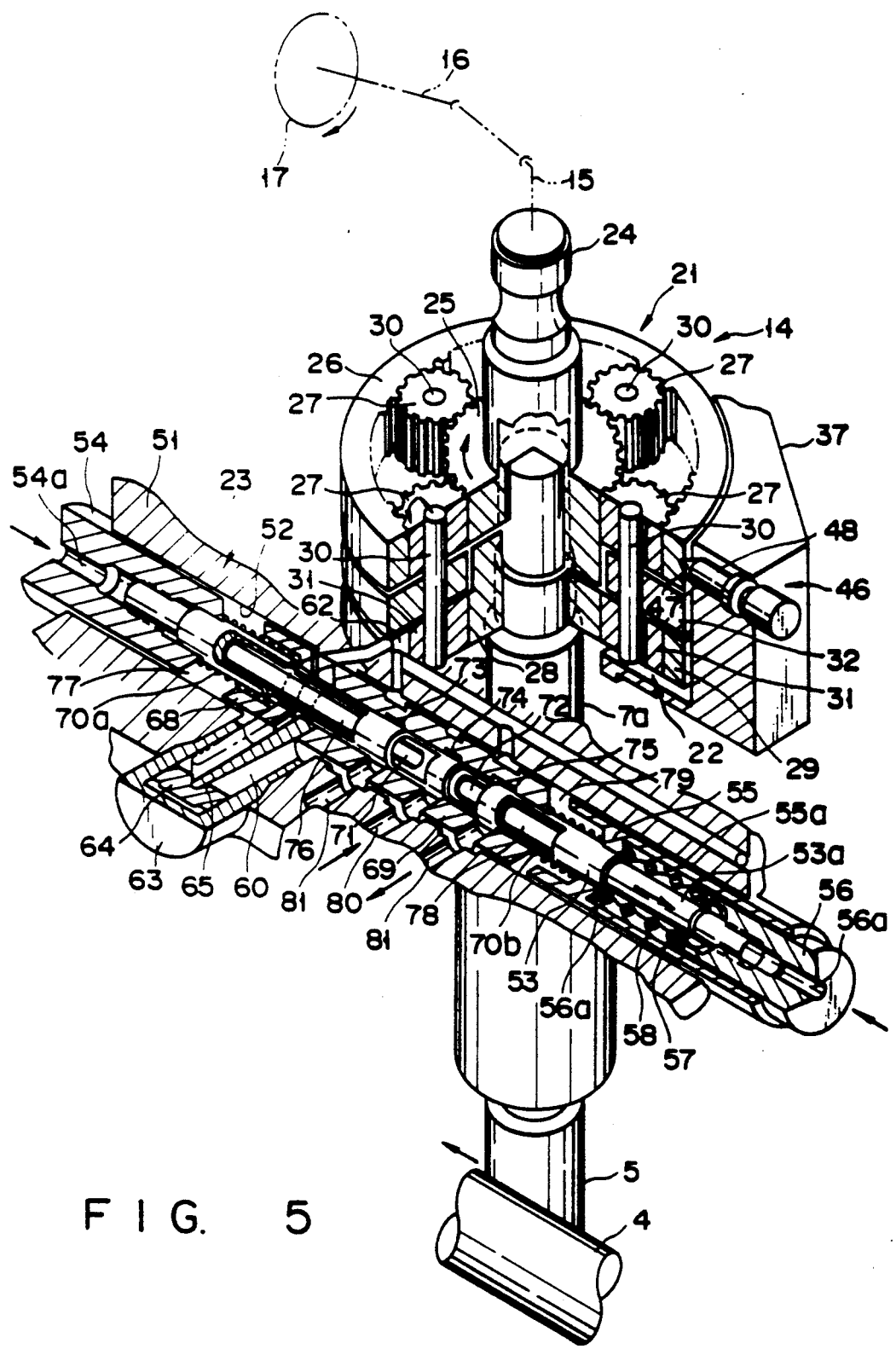
Figure 6:
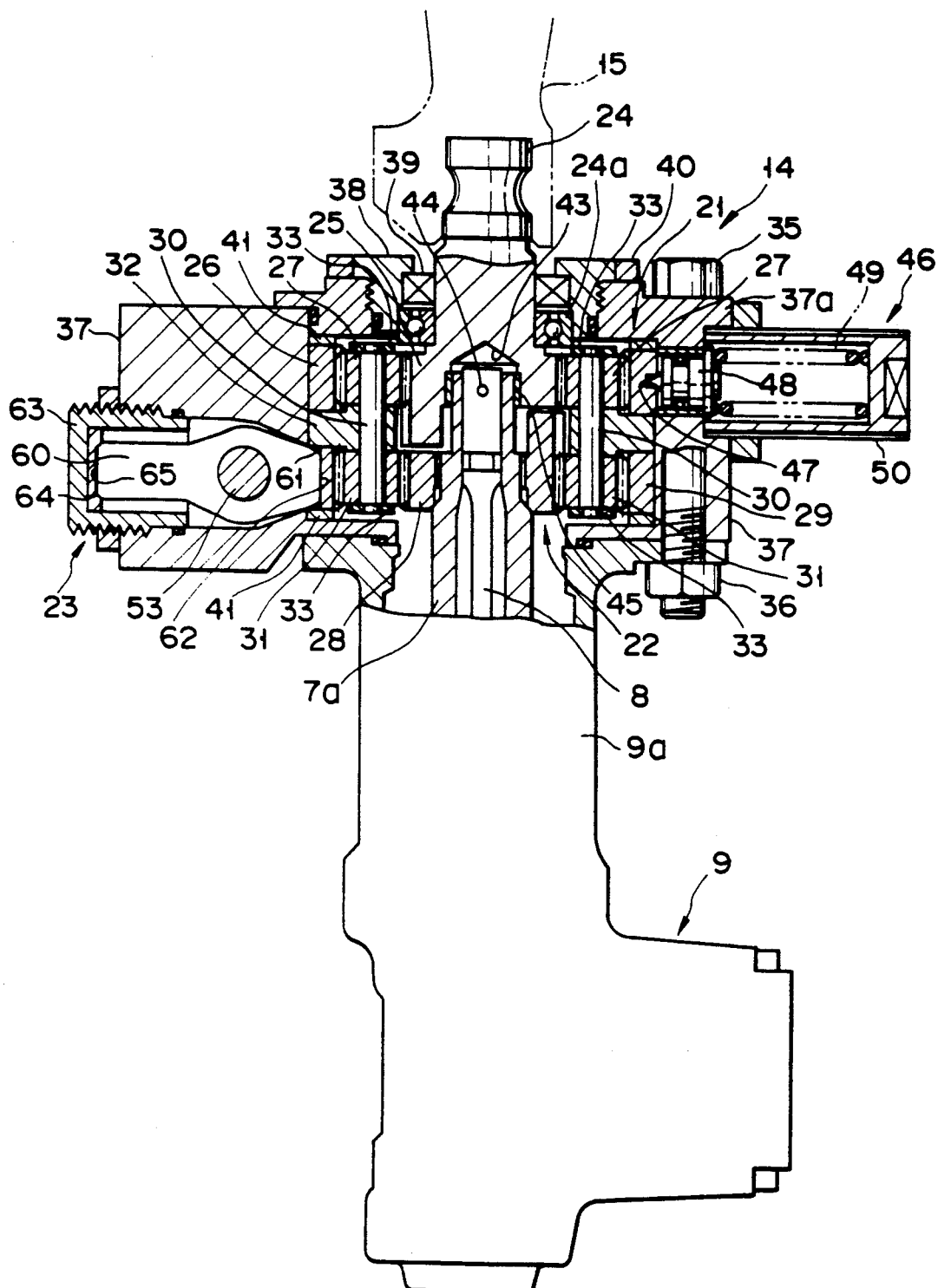
Figure 7:
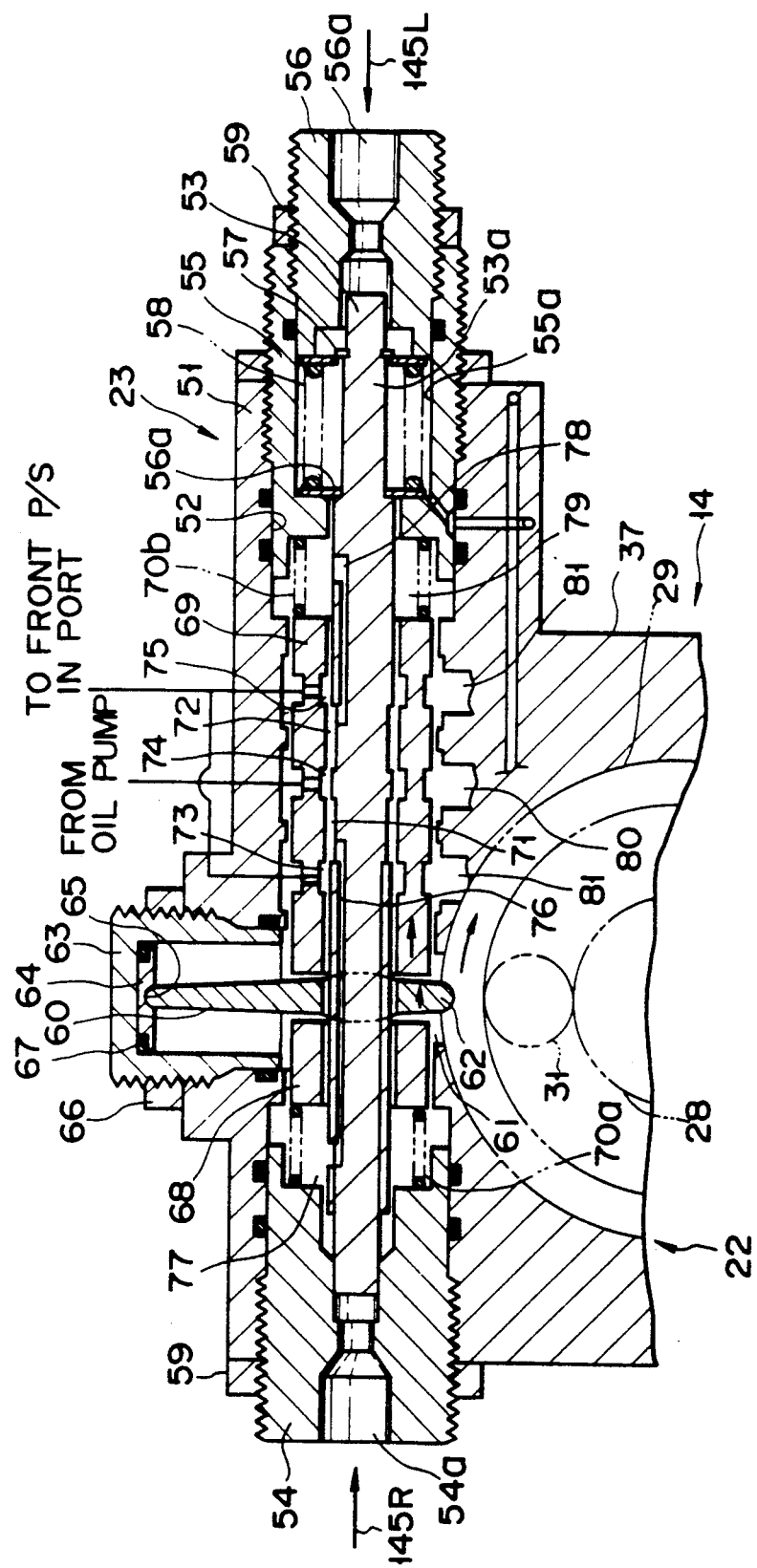

The phase-advancing mechanism 14 will be described in detail below. As shown in FIGS. 5 to 7, the phase-advancing mechanism 14 comprises two planetary gear mechanisms 21 and 22 and a control valve 23.

More specifically, the mechanism 14 comprises a case 37 arranged at an upper end portion of the case 9a of the steering gear box 9 and a screw-in cap 37a for closing an upper opening of the case 37. The case 37 and the cap 37a are fixed to the case 9a by bolts 35 which extend through the case 37 and nuts 36 threadably engaged with the bolt ends, thereby constituting a body of the phase-advancing mechanism 14. An input shaft 24 is rotatably supported by a bearing 24a to be coaxial with the valve input shaft 7a in an upper portion within the case 37. A sun gear 25 is integrally mounted on the circumferential surface of the lower portion of the input shaft 24. A ring gear 26 supported by the case 37 is arranged around the sun gear 25. Four planetary gears 27 are located between the ring gear 26 and the sun gear 25 on the same plane and meshed with the gears 26 and 25, thereby constituting the first-stage planetary gear mechanism 21. The upper end portion of the valve input shaft 24 extends upward from the upper opening of the case 9a, and is connected to the intermediate joint 15. Another sun gear 28 having the same specifications as those of the first-stage planetary gear mechanism is mounted on the circumferential surface of the lower end portion of the valve input shaft 24 located within the case 37. Another ring gear 29 having the same specifications as those of the first stage is arranged around the sun gear 28 within the case 37. Four rotatable planetary gears 31 are arranged between the ring gear 29 and the sun gear 28 of the second stage. These gears 31 are coaxially coupled with the first-stage planetary gears 27 through shafts 30 and meshed with the ring gear 29 and the sun gear 28 of the second stage, thereby constituting the second-stage planetary gear mechanism 22. The planetary gears 27 and 31 are supported to be circumferentially movable around the center of the valve input shaft 24 by an annular holder 32 for holding the shafts 30 and gear regulating holders 33 mounted on both ends of each shaft 30.

An adjuster 38 is arranged on the cap 37a to regulate vertical movement of the bearing 24a, so that the planetary gear mechanisms 21 and 22 are located at predetermined positions. Reference numeral 39 denotes a seal member; 40, a loosening preventive nut of the adjuster 38; 41, a spacer for regulating vertical movement of the ring gears 26 and 29.

The distal end portion of the valve input shaft 7a is inserted into a recess 43 formed on a lower end face of the input shaft 24. The torsion bar 8 is inserted into the hollow shaft 7a, and the upper end of the torsion bar 8 is connected to the upper end of the shaft 7a through a pin 44. Therefore, when the steering wheel 17 is turned while the ring gears 26 and 29 are kept fixed, a steering angle of the steering wheel 17 can be transmitted to the rotary valve 7 and the torsion bar 8 through the first- and second-stage planetary gear mechanisms 21 and 22 at the same ratio. Note that a metal bushing 45 is interposed between the recess 43 and the upper end portion of the valve input shaft 7a to prevent circumferential cluttering.

A safety unit 46 is arranged in the first-stage planetary gear mechanism 21 to prevent a torque, having a magnitude more than the necessary magnitude, from being transmitted to the mechanism 21 from the steering wheel 17. More specifically, the safety unit 46 comprises a recess 47 formed on the outer circumferential surface of the ring gear 26, a pin member 48 provided at the case 37 and fitted in the recess 47, and a set screw constituted by a spring 49 for biasing the pin member 48 in the fitting direction, and an adapter component 50. The safety unit 46 has a structure for regulating rotational movement of the ring gear 26 by means of the recess 47 and the pin member 48. When a steering force exceeding a predetermined value is input from the steering wheel 17 to the ring gear 26, the above-mentioned fitting is released to allow rotation of the ring gear 26, thereby preventing the planetary gear mechanisms 21 and 22 from receiving an excessive torque. Although omitted from the drawings, stoppers constituted by step portions are formed on the end of the input shaft 24 and the end of the valve input shaft 7a which is inserted into the shaft 24. When the ring gear 26 is rotated through a predetermined angle, the step portions abut against each other to directly transmit a steering force of the steering wheel 17 from the input shaft 24 to the valve input shaft 7a.

The control valve 23 is arranged in the case 37 in which the planetary gear mechanisms 21 and 22 are located.

The control valve 23 comprises an elongated valve body 51. The valve body 51 is integrally formed with the case 37 near the ring gear 29 and extends in a direction perpendicular to the center axis of the planetary gear mechanism 22. A substantially cylindrical valve chamber 52 is formed in the valve body 51 and extends in a direction perpendicular to the axis of the ring gear 29. A spool 53 is arranged in the valve chamber 52. One end portion of the spool 53 is slidably supported by a plug 54 fitted into one end portion of the valve chamber 52. The other end of the spool 53 is slidably supported by a plug 56 fitted into the other end portion of the valve chamber 52 through an adapter 55. Two opposite end faces of the spool 53 face holes 54a and 56a formed in the plugs 54 and 56. Inside the adapter 55 is defined a spring chamber 55a in which a spring 58 is housed. One end of the spring 58 abuts against a washer 56a slidably fitted on a small-diameter portion 53a of the other end portion of the spool 53. The other end of the spring 58 abuts against a snap ring 57 fixed to the end portion of the small-diameter portion 53a. Therefore, the spool 53 is positioned by the spring 58. Reference numerals 59 denote nuts for preventing loosening of the plugs 54 and 56 and the adapter 55.

A plate-like lever 60 is arranged in the valve body 51, and a shaft portion of the spool 53 movably extends through the lever 60. The lever 60 extends in a direction perpendicular to the axis of the ring gear 29. The distal end of the lever 60 on the side of the ring gear 29 is arcuated, extends through a through hole 61 formed in the valve body 51 and the case 37, and is engaged with a groove 62 formed on the circumferential surface of the ring gear 29. The narrow proximal end of the lever 60 is arcuated, and is engaged with a groove 65 formed in a plate 64 which is arranged on the inner bottom surface of the cup-like adapter 63 mounted on the valve body 51 to cover the lever 60. Along the axis of the spool 53, the lever 60 is pivotal about its proximal end engaged with the groove 65 of the plate 64. Reference numeral 66 denotes a loosening preventive nut for the adapter 63; and 67, a corrugated washer interposed between the plate 64 and the inner bottom surface of the adapter 63.

A collar 68 and a sleeve 69 are slidably fitted on the outer circumferential surface of the spool 53 so as to interpose the lever 60 therebetween. Springs 70a and 70b are arranged between the collar 68 and the plug 54 and between the sleeve 69 and the plug 56, respectively. The collar 68 and sleeve 69 are urged against both surfaces of the lever 60 by biasing forces or elastic forces (preload) of these springs. As a result, three components including the lever 60 are positioned on the outer circumferential side of the spool 53. Two annular grooves are formed on that portions of the outer circumferential surface of the spool 53 which are covered with the sleeve 69. These annular grooves define two inlet chambers 71 and 72 tandem with each other. Three annular grooves are formed on the inner circumferential surface of the sleeve 69 to oppose the boundary portion between the chambers 71 and 72. These annular grooves define three outlet chambers 73, 74, and 75. The chamber 71 communicates with a pressure reception chamber 77 serving as a spring chamber formed between the collar 68 and the plug 54, through a path 76 formed inside the spool 53. Similarly, the chamber 72 communicates with a pressure reception chamber 79 serving as a spring chamber formed between the sleeve 69 and the adapter 55, through a path 78 formed inside the spool 53. Of outlet chambers, a central chamber 74 is connected to a delivery side of the oil pump 13 through a port 80 formed in the valve body 51. Remaining outlet chambers 73 and 75 are connected to an inlet port (not shown) of the rotary valve 7 of the power steering unit 6 through ports 81 formed in the valve body 51. Therefore, the valve 23 constitutes a tracking type servo valve which holds the ring gear 29 to a predetermined position and increase an input steering angle by utilizing hydraulic pressure generated by the oil pump 13. More specifically, oil from the oil pump 13 flows into the pressure reception chambers 77 and 79 through the paths 76 and 78. When the sleeve 69 is displaced in one direction by a steering reaction force transmitted from the second-stage ring gear 29, the chambers 71 and 72 and the chambers 73 to 75 are closed or opened in accordance with the displacement direction of the sleeve. For this reason, a larger amount of oil flows into the pressure reception chamber located in the displacement direction of the sleeve 69. At the same time, oil flows out from the remaining pressure reception chambers. Thus, the displaced sleeve 69 is returned to the previous position so as to return the ring gear 29 to the previous position. When hydraulic force is applied through the holes 54a and 56a of the plugs 54 and 56 on the spool 53 to displace the spool 53 and then relative displacement occurs between the sleeve 69 and the spool 53, hydraulic pressure for causing the sleeve 69 to follow the displacement of the spool 53 acts on the sleeve 69. For this reason, the sleeve 69 is moved following the displacement of the spool 53 to rotate the lever 60, thereby rotating the ring gear 29.

A rear-wheel steering system will be described with reference to FIG. 1. Left and right rear wheels 82a and 82b are supported by double wishbone rear-wheel suspensions with toe control mechanisms. The rear wheels 82a and 82b are rotatably supported by the rear ends of a pair of trailing arms 87, respectively. In each rear-wheel suspension, mounted on across member 83 are a pair of upper and lower lateral arms consisting of upper arms 84 and lower arms 85, and toe control arm 86. The toe control arm 86 is connected to the front end of the trailing arm 87 through an intermediate joint 88. The arms 84 and 85 are connected to the rear end of the trailing arm 87 through ball joints. The intermediate joint 88 has a pivot shaft 89 such as a pin whose axis of rotation extends in the vertical direction. When the intermediate joint is displaced in a widthwise direction of the vehicle body, the rear wheels 82a and 82b can be steered.

Figure 2:
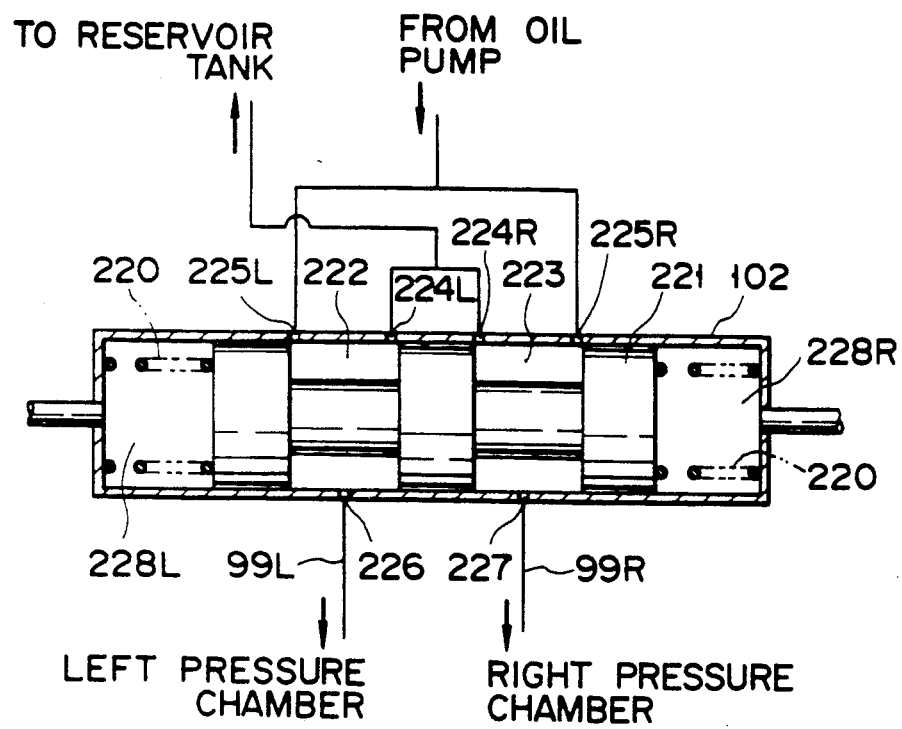

The front ends of the trailing arms 87 are connected to left and right connecting rods 96a and 96b of a rear power cylinder 90 for rear-wheel steering. The power cylinder 90 which serves as a hydraulic actuator is fixed on the cross member 83. The power cylinder 90 is a two-step structure type, and includes a cylinder 94 which has a large-diameter central cylinder chamber 91 and small-diameter cylinder chambers 92R and 92L located on the both side of the cylinder chamber 91; and a piston 95 slidably arranged in the cylinder 94. The piston 95 includes a central piston portion 95a having a diameter corresponding to that of the cylinder chamber 91, and piston portions 95b located on both side of the portion 95a and having a diameter corresponding to that of the cylinder chambers 92R and 92L. The connecting rods 96a and 96b extend from the piston portions 95a and 95b through the cylinder 94. The cylinder chamber 91 is partitioned by the piston portion 95a into left and right pressure chambers 97L and 97R for receiving hydraulic outputs for in-phase steering. Antiphase hydraulic pressures are applied in the cylinder chambers 92R and 92L. The cross-sectional area of each of the pressure chambers 97L and 97R is larger than that of the cylinder chambers 92L and 92R. The rear wheels 82a and 82b can be steered to the right or left in accordance with a displacement of the piston 95 in the widthwise direction of the vehicle body. The left and right pressure chambers 97L and 97R are connected to an in-phase steering control valve 98 through oil paths 99L and 99R. The cylinder chambers 92L and 92R are connected to an auxiliary steering control valve 100 through oil paths 101L and 101R. The in-phase steering control valve 98 is constituted by a spool valve of a throttle control type, as schematically illustrated in FIG. 2. The control valve 98 comprises a cylindrical case 102, a spool 221 arranged in the case 102 and having three lands, and a pair of left and right springs 220 arranged on both sides of the spool 221 to bias the spool 221 toward the neutral position. The case 102 includes two inlet ports 225L and 225R for receiving pressured oil, return ports 224L and 224R located between the inlet ports 225L and 225R to exhaust the pressured oil, and left and right output ports 226 and 227 respectively formed between the inlet port 225L and the return port 224L and between the inlet port 225R and the return port 224R. The three lands of the spool 221 cause to change communication states of the adjacent ports and restriction amounts of the ports in accordance with a displacement of the spool 221, thereby controlling a pressure difference between the left and right output ports 226 and 227. Left and right pilot pressure chambers 228L and 228R for receiving pilot pressures for controlling the operation of the spool 221 are defined on both sides of the spool 221. The pilot pressure chambers 228L and 228R communicate with left and right pressure chambers 18 and 19 of the power steering unit 6 through pilot oil paths 103L and 103R, respectively. The two inlet ports 225L and 225R are connected to the delivery port of an oil pump 105. As shown in FIG. 1 the oil pump 105 is driven by a ring gear of a differential unit 104 for driving the rear wheels, draws the oil from the reservoir tank 106, and delivers an amount of oil depending on a vehicle speed. A relief valve 190 is arranged at the delivery port of the oil pump 105 so that the delivery flow rate is kept constant when the vehicle is traveling at a speed higher than a predetermined speed corresponding to a considerable high-speed range. The return ports 224L and 224R are connected to the reservoir tank 106, and the left and right output ports 226 and 227 are connected to the left and right pressure chambers 97L and 97R of the rear power cylinder 90 through the oil paths 99L and 99R, respectively.

With the in-phase steering control valve 98 having the above arrangement, the displacement (restriction amount) of the spool 221 is controlled by hydraulic pressure generated by the power steering unit 6, and the amount of oil to be supplied into the valve 98 can be controlled in correspondence with the vehicle speed. For this reason, the pressure difference generating between the left and right output ports 226 and 227 (between the pressure chambers 97L and 97R) becomes larger with an increase in the hydraulic pressure generated by the power steering unit 6 (i.e., the steering force increases) or in the vehicle speed. The force of the in-phase steering direction which is generated by the rear power cylinder 90 is changed in accordance with this pressure difference.

Figure 3:
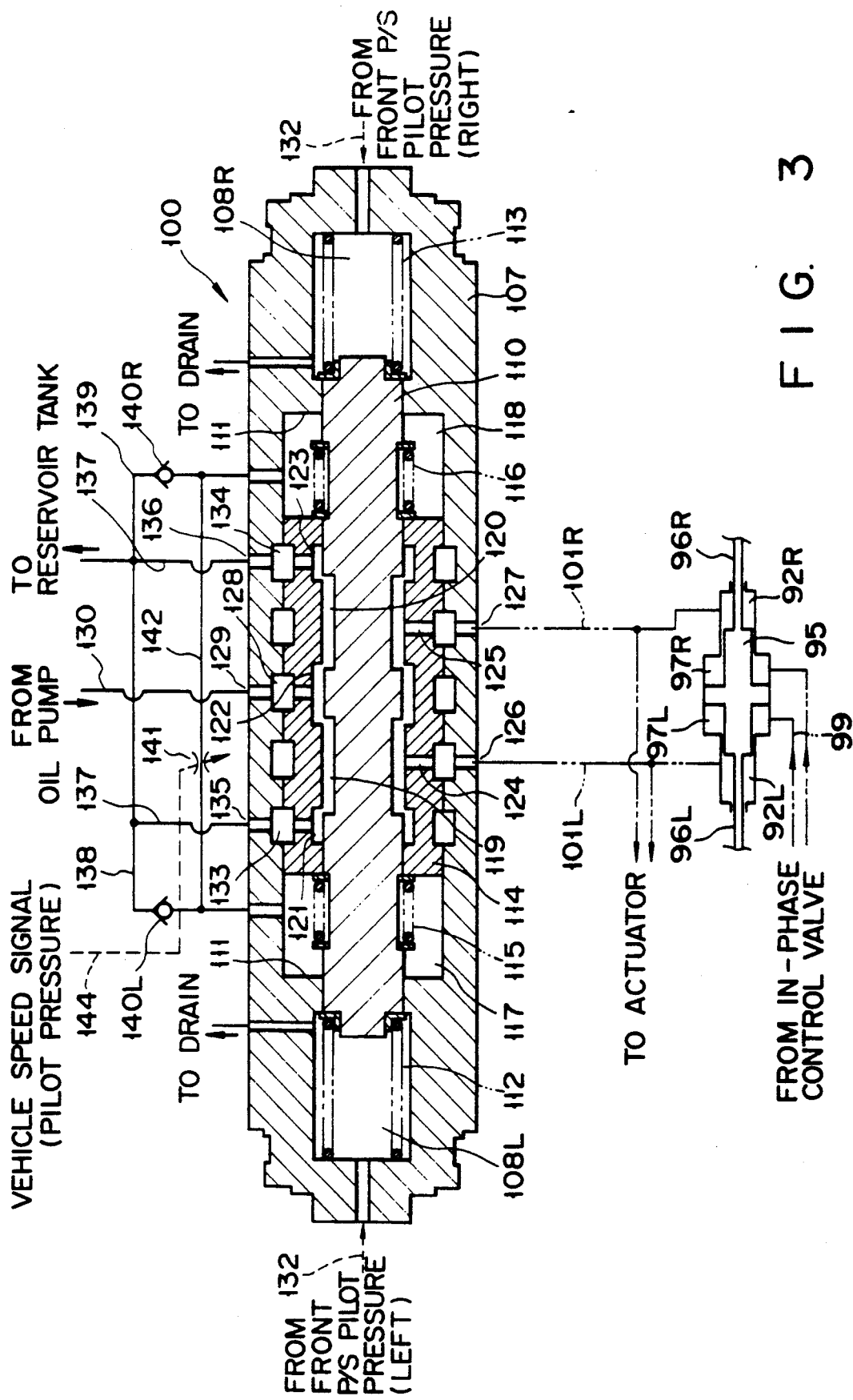
Figure 4:
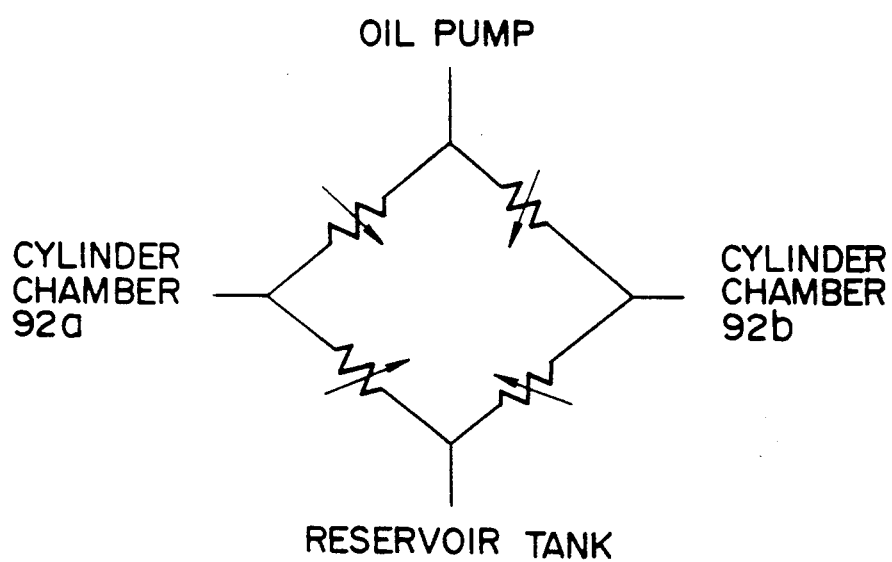

FIGS. 3 and 4 show a detailed structure of the auxiliary steering control valve 100. However, FIG. 4 schematically shows the structural concept of the control valve. The control valve 100 is a 4-port restricting selector of a spool valve type. The control valve 100 comprises a cylindrical case 107 and a spool 110 having three lands arranged within the case 107. The spool 110 is slidable in an axial direction of the case 107 while circumferential portions of two opposite ends of the spool are supported by bearings 111 formed on the inner surface of the case 107. A pair of springs 112 and 113 are inserted between one end of the spool 110 and the case 107 and between the other end of the spool and the case 107, respectively, to bias the spool 110 to its neutral position. These springs 112 and 113 are housed in left and right pilot pressure introduction chambers 108L and 108R defined outside the bearings 111 of the case 107. The chambers 108L and 108R are connected through oil paths 132L and 132R to midway along the pilot oil paths 103L and 103R which respectively communicate with the left and right pressure chambers 18 and 19 of the power steering unit 6.

An inner surface of that portion of the case which is located between the pair of bearings 111 is enlarged. A sleeve 114 having an outer diameter corresponding to this large-diameter portion is slidably fitted on a central portion of the spool 110, which faces this large-diameter portion. Both ends of the sleeve 114 are biased by a pair of springs 115 and 116 fixed to the spool 110 so that the sleeve 114 is biased to its neutral position. Spaces defined by both ends of the sleeve 114 and the pair of bearings 111 house the springs 115 and 116 therein and serve as pressure reception chambers 117 and 118.

Figure 8:
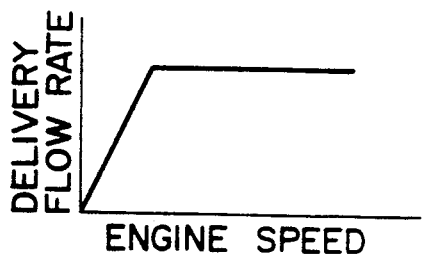
Figure 9:
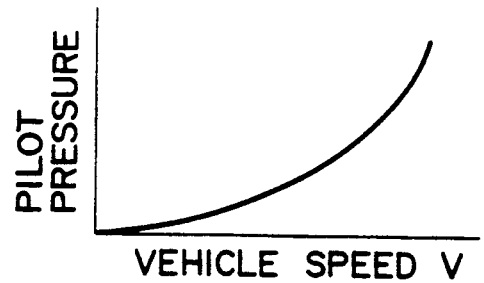

Two chambers 119 and 120 in tandem with each other are defined by annular grooves which are located between the two adjacent lands of the spool 110 and formed on that portion of the outer circumferential surface of the spool 110 which is covered with the sleeve 114. Three chambers 121 to 123 defined by annular grooves are formed on the inner surface of the sleeve 114 at positions facing the boundary portions of the chambers 119 and 120, i.e., positions opposite to the lands of the spool 110. The chambers 119 and 120 respectively communicate with left and right output ports 126 and 127 bored in the outer surface of the case 107, through paths 124 and 125 each formed in the sleeve 114 and the case 107. The output ports 126 and 127 are connected to the cylinder chambers 92L and 92R of the rear power cylinder 90 through the oil paths 101L and 101R, respectively. The chamber 122 communicates with an inlet port 129 formed in the case 107 through a path 128. The inlet port 129 is connected through an oil path 130 to the delivery port of an oil pump 131 of a constant flow rate type driven together with the oil pump 13 by the engine 20. The oil pump 131 has the delivery flow rate characteristics as shown in FIG. 8, and supplies the port 129 with pressured oil at a constant flow rate.

The remaining chambers 121 and 123 communicate with return ports 135 and 136 formed in the outer surface of the case through path spaces 133 and 134 formed in the sleeve 114 and the case 104, respectively. The return ports 135 and 136 are connected to the reservoir tank 106 in parallel to each other through oil paths 137. The oil paths 137 are connected in parallel to the pressure reception chambers 117 and 118 defined on both sides of the sleeve 114 through oil paths 138 and 139, respectively. Check valves 140L and 140R are respectively arranged in the oil paths 138 and 139 to regulate an oil flow toward the reservoir tank 106.

A communication path 142 for generating pressure difference is connected at one end to a communication portion between the check valve 140L and the pressure reception chamber 117 and at the other end to a communication portion between the check valve 140R and the pressure reception chamber 118. The path 142 is provided with a variable orifice 141 (or variable throttle or variable choke). The variable orifice 141 communicates through an oil path 144 with the oil pump 105 driven by the differential unit 104. The orifice 141 is actuated by hydraulic pressure having a characteristic shown in FIG. 9 and supplied from the pump 105, and the throttle amount of the orifice 141 varies in accordance with a vehicle speed. The variable orifice 141 is constructed so as to control an overlap amount between a variable spool and a casing (both not shown), thereby adjusting the throttle amount of the communication path 142. More specifically, the variable spool is arranged in the communication path 142 and urged by a spring in a direction for increasing the throttle amount of the path 142. A throttle (not shown) is located in the delivery oil path of the oil pump 105. The difference between the pressures on the upstream side and the downstream side of the throttle is applied on the two opposite ends of the variable spool, thereby reducing the throttle amount of the orifice 141 in accordance with an increase in vehicle speed.

In the control valve 100 having the above arrangement, the spool 110 is slid and displaced in accordance with the hydraulic pressure generated by the power steering unit 6 which is introduced into the pilot pressure chambers 108L and 108R. However, since the pressure reception chambers 117 and 118 communicate with each other through the orifice 141, when a displacement speed of the spool 110 is high, the sleeve 114 cannot immediately follow the displacement of the spool 110 and is delayed from the displacement of the spool 110. When a relative displacement is present between the spool 110 and the sleeve 114 in this manner, hydraulic pressure corresponding to the relative displacement is output as a pressure difference to the output ports 126 and 127 by means of the valve constituted by the outer surface of the spool 110 and the inner surface of the sleeve 114. That is, with an increase in the relative displacement between the spool 110 and the sleeve 114, the hydraulic pressure output from the control valve 110 increases. With an increase in the rate of variation in the power steering hydraulic pressure which influences the displacement speed of the spool 110 or a decrease in the speed for controlling the throttle amount of the variable orifice 141 serving as a displacement resistance of the sleeve 114, the output hydraulic pressure from the valve 110 increases. The hydraulic pressure output from the control valve 110 is supplied to the cylinder chambers 92R and 92L of the rear power cylinder 90 and serves as a force for steering the rear wheels in a direction opposite to that of the front wheels. The variable orifice 141 serves as differential element. Therefore, in such a case wherein no variation in the power steering hydraulic pressure occurs, e.g., in a case wherein the steering angle of the steering wheel is constant during steering of the front wheels, the sleeve 114 is returned by the springs 115 and 116 to its neutral position with respect to the spool 110. Thus, the hydraulic pressure is no longer produced from the valve 100. For this reason, the hydraulic pressure output from the control valve 110 is approximately controlled in accordance with the steering speed of the steering wheel.

The operation direction and the actuation amount of the rear power cylinder 90 are controlled by the composite force of a in-phase steering force applied from the in-phase steering control valve 98 to the pressure chambers 97L and 97R and an antiphase steering force applied from the auxiliary steering control valve 100 to the cylinder chambers 92L and 92R. In other words, the rear wheels are steered by the composite force of two opposite inputs.

The holes 54a and 56a of the plugs 54 and 56 of the phase-advancing mechanism 14 are connected through oil paths 145L and 145R to the intermediate portions of the oil paths 101L and 101R which are connected to the output port of the auxiliary steering control valve 100. The hydraulic pressure output from the control valve 100 also acts on the phase-advancing mechanism 14 in a direction to increase the steering angle of the front wheels. For this reason, the control valve 100 controls both the antiphase steering of the rear wheels and the phase-advancing steering of the front wheels.

The operation of the four-wheel steering apparatus having the above-mentioned arrangement will be described.

When the vehicle is running straight ahead, the steering wheel 17 is held in the neutral state, so that the front wheels 1a and 1b and the rear wheels 82a and 82b are directed straight ahead.

When the steering wheel 17 is turned, e.g., clockwise to turn the vehicle to the right (in middle- and high-speed driving), the rear wheels 82a and 82b are temporarily steered in opposite phase to the front wheels in accordance with the steering angular velocity of the steering wheel and the vehicle speed, and the steering angle of the front wheels 1a and 1b is increased in accordance with the steering angle of the steering wheel.

More specifically, when the steering wheel 17 is turned, this rotation is transmitted to the sun gear 25 of the first-stage planetary gear mechanism 21 through the column shaft 16, the intermediate joint 15, and the input shaft 24. In this case, the ring gear 26 receives an operation force. However, since the ring gear 26 is fixed to the case 37 by the safety unit 46, the rotation of the sun gear 25 is transmitted to the planetary gears 31 of the second-stage planetary gear mechanism 22 through the planetary gears 27. At this time, the ring gear 29 of the second-stage planetary gear mechanism 22 tends to rotate upon reception of the operation force. However, the ring gear 29 is applied with an reaction force or a restoration force (i.e., a force for always nullifying the displacement of the sleeve 69 relative to the spool 53 by means of the hydraulic pressure produced by the oil pump 13) generated by the control valve 23 to always return the ring gear 29 to its original position, so that the gear 29 is not rotated. For this reason, the rotational force from the planetary gears 31 is transmitted to the valve input shaft 7a and the torsion bar 8 through the sun gear 28. Therefore, rotation transmitted to the torsion bar 8 is transmitted to the pinion 5, thereby steering the front wheels 1a and 1b in a direction corresponding to the steering direction of the steering wheel 17. At the same time, hydraulic pressure corresponding to a torsion amount (i.e., the steering force of the steering wheel 17) of the torsion bar 8 is supplied from the rotary valve 7 to the right chamber 19 of the power cylinder 10, thereby assisting the steering of the steering wheel 17. In this state, the pressure in the right chamber 19 of the cylinder 11 is high, while the pressure in the left chamber 18 is low. The pressure in the left and right chambers 18 and 19 is applied as pilot pressure to the in-phase steering control valve 98 and the auxiliary steering control valve 100 through the oil paths 103L and 103R, respectively.

In the in-phase steering control valve 98, the pilot pressure chamber 228R is set in the high-pressure state, while the pilot pressure chamber 228L is set in the low-pressure state. The spool 22 is then displaced to the left in accordance with the power steering hydraulic pressure. For this reason, the hydraulic pressure produced in accordance with the spool displacement and the amount of oil supplied from the oil pump 105 sets the output port 226 in the high-pressure state and the output port 227 in the low-pressure state. These pressures act on the left and right pressure chambers 97L and 97R of the rear power cylinder 90 through the oil paths 99L and 99R. Therefore, the piston 95 of the rear power cylinder 90 receives the hydraulic pressure for steering the rear wheels clockwise (the in-phase direction) from the left pressure chamber 97L. In this manner, the hydraulic pressure for the in-phase steering varies in accordance with the vehicle speed and hydraulic pressure generated by the power steering unit.

In the auxiliary steering control valve 100, by the hydraulic pressure supplied from the power steering unit through the oil paths 132L and 132R, the pressure in the pilot pressure chamber 108R becomes high and the pressure in the pilot pressure chamber 108L becomes low. Thus, the spool 110 is displaced to the left in FIG. 3 in accordance with the power steering hydraulic pressure. The displacement speed of the spool 110 depends on the rate of variation in the power steering hydraulic pressure. However, the sleeve 114 is biased to its neutral position by the springs 115 and 116 with respect to the spool 110, and the pressure reception chambers 117 and 118 on both sides of the sleeve 114 communicate with each other through the throttle 141. The throttle 141 serves as a resistance to a change in volumes of the pressure reception chambers 117 and 118. Accordingly, the sleeve 114 cannot immediately follow the displacement of the spool 110. For this reason, only the spool 110 is greatly displaced to the left to cause a displacement relative to the sleeve 114. However, the sleeve 114 gradually follows the spool 110 to the left by the spring force. The temporary relative displacement is larger when the displacement speed of the spool 110 is higher (i.e., the rate of variation in the power steering hydraulic pressure is higher) or the throttle amount of the orifice 141 is larger (i.e., the vehicle speed is higher). In a state wherein the relatively displacement occurs, since the amount of oil supplied from the oil pump 131 is constant, hydraulic pressure mainly corresponding to this relative displacement is generated. The output pressure of the valve 100 is high in the output port 127 and low in the output port 126. The output pressure from the port 127 and that from the port 126 are supplied to the cylinder chambers 92R and 92L of the rear power cylinder 90 through the oil paths 101R and 101L. Therefore, the piston 95 of the rear power cylinder 90 receives the hydraulic pressure from the right cylinder chamber 92R to steer the rear wheels counterclockwise (i.e., in the antiphase direction). This hydraulic pressure is higher when the vehicle speed is lower or the rate of change in the power steering hydraulic pressure is higher.

The principle of operation of the control valve 100 will be described below. If the displacement of the spool 110 upon reception of the hydraulic pressure from the power steering unit as pilot pressure is assumed as x1, the displacement x1 is associated with the product of an area of the end face of the spool 110 and the pilot pressure and with the elastic forces of the springs 112 and 113, so that these components have the following relation:

$$a1 \cdot F1 = K1 \cdot x1 + f1$$

that is, $$x1 = (a1 \cdot F1 - f1)/K1$$

where a1 is the area of the end face of the spool, K1 is the spring constant of each of the springs 112 and 113, f1 is the preload value of the spring, and F1 is the pilot pressure.

The sleeve 114 tends to move in the same direction as the spool 110 upon the displacement thereof. For this purpose, the oil must flow from the pressure reception chamber 117 into the pressure reception chamber 118 through the communication path 142. However, since the variable orifice 141 is arranged in the communication path 142, pressure difference $\Delta P$ is produced between the inlet and outlet of the orifice 141. The pressure differential $\Delta P$ can be defined as follows:

$$\Delta P = \delta \cdot Qb^2 / 2 \cdot Cd \cdot d^2$$

where $\delta$ is the fluid density, Qb is the flow rate of the oil flowing through the orifice, d is the sectional area of the orifice, and Cd is the flow rate coefficient.

If an orifice with a choke structure is employed, the pressure difference $\Delta P$ is defined as follows:

$$\Delta P = 8 \cdot \pi \cdot \mu \cdot l / d^2$$

where l is the length of the orifice, and $\mu$ is the viscosity coefficient of the oil.

The sleeve 114 is displaced by the pressure difference $\Delta P$ to the right relative to the spool 110. In this case, the relative displacement y of the sleeve 114 is given as follows:

$$y = (\Delta P \cdot b2 - f2)/K2$$

where b2 is the area of the end face of the sleeve, K2 is the spring constant of each of the springs 115 and 116, and f2 is the preload value of the spring.

Since oil having a predetermined flow rate is supplied to the valve 100 from the oil pump 131 through the inlet port 129, pressure difference proportional to the relative displacement y is output from the outlet ports 126 and 127. That is, the relative displacement y is a function of $$y \propto \Delta P \propto Qb \propto 1 \propto 1/d^2$$

therefore $$Qb = b2 \cdot (x1 - y)/t$$

is obtained (t is time).

Since the term (x1−y) is proportional to the pilot pressure, the hydraulic pressure (pressure difference) output from the outlet ports 126 and 127 decreases in accordance with a decrease in the vehicle speed and is controlled in proportion to the rate of change in the hydraulic pressure from the power steering unit 6 (i.e., the rate of change in the steering force of the steering wheel 17).

This hydraulic pressure (pressure difference) is supplied as hydraulic force to the cylinder chambers 92R and 92L of the rear power cylinder 90 to steer the rear wheels 82a and 82b in opposite phase to the front wheels. At the same time, this hydraulic pressure is supplied to the plug 54 of the phase-advancing mechanism 14 as an output for increasing the steering angle of the front wheels 1a and 1b.

Figure 11:
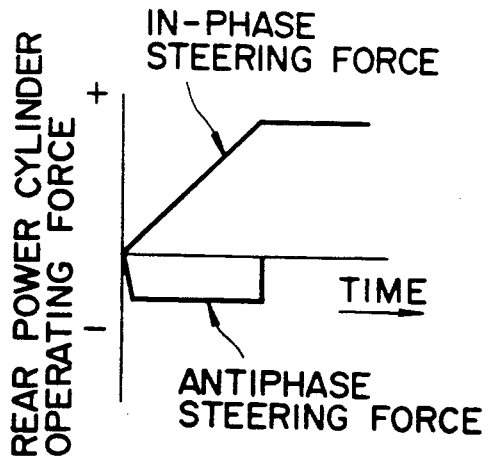
Figure 12:
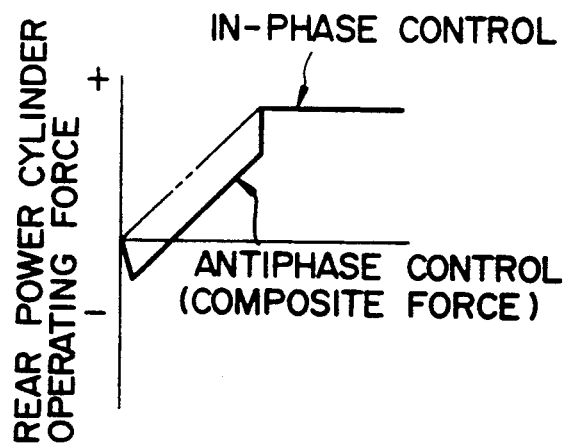

In the rear power cylinder 90, the hydraulic pressure supplied into the pressure chamber 97L to steer the rear wheels clockwise (in the in-phase direction) and the hydraulic pressure supplied into the cylinder chamber 92R to steer the rear wheels counterclockwise (in the antiphase direction) are applied on the piston 95 in the opposite directions and combined with each other. The piston 95 is thus controlled by this composite pressure. FIG. 11 shows the relationship between the in-phase steering force generated in correspondence with the power steering hydraulic pressure and the antiphase steering force generated in correspondence with the rate of change in the power steering hydraulic pressure. By the combination of both the steering forces, a rear-wheel steering angle with characteristics shown in FIG. 12 can be obtained.

When the power steering hydraulic pressure increases as in the case wherein the steering wheel 17 is turned from its neutral position, the rear-wheel steering angle in the in-phase direction, which increases with an increase in the power steering hydraulic pressure, is decreased in accordance with a decrease in the rate of change in the power steering hydraulic pressure. In practice, after the rear wheels are temporarily steered in opposite phase to the front wheels in the initial period of steering of the front wheels, the rear wheels are steered in phase with the front wheels. When the vehicle speed is higher, the in-phase steering force is increased and the antiphase steering force is decreased. Therefore, in accordance with an increase in the vehicle speed, the antiphase steering amount in the initial period of steering can be reduced, and the in-phase steering angle is increased. When the vehicle speed is low, the in-phase steering force decreases and the antiphase steering force increases. In this case, the antiphase steering amount in the initial period of steering is increased, and the in-phase steering angle is decreased.

When no change in the power steering hydraulic pressure occurs as in the case wherein the steering wheel is held unchanged, no hydraulic output is produced by the control valve 100. In this case, therefore, the in-phase rear-wheel steering angle corresponding to the power steering hydraulic pressure is obtained.

When the power steering hydraulic pressure is decreased such that the steering wheel is returned from the steered state to the neutral state, the hydraulic output from the control valve 100 is reversed in phase. In this case, the steering angle of the rear wheels in the in-phase direction, which is decreased with a decrease in the power steering hydraulic pressure, increases in accordance with the rate of change in the power steering hydraulic pressure.

Figure 10:
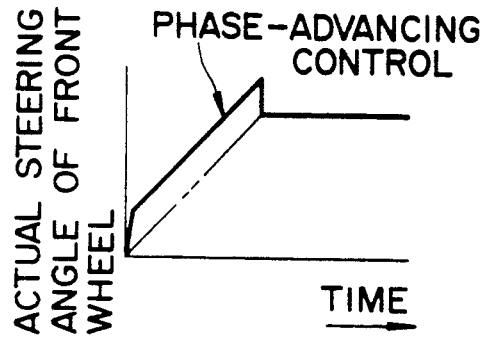

The hydraulic pressure output from the auxiliary steering control valve 100 acts on the rear power cylinder 90 to correct a rear-wheel steering angle in the antiphase direction and also acts on the phase-advancing mechanism 14 through the oil paths 145L and 145R. When high hydraulic pressure produced at the outlet port 127 of the control valve 100 during clockwise steering of the steering wheel 17 acts as a control pressure on the hole 54a of the plug 54 of the phase-advancing mechanism 14 through the oil paths 101R and 145R, the spool 53 slides to the right as indicated by the arrow in FIG. 7 in proportion to the hydraulic pressure. The sleeve 69 and the collar 68 follow the displacement of the spool 53 by the restoration function performed by the hydraulic pressure from the oil pump 13 until the difference in relative position between the spool 53 and the sleeve 69 or the collar 68 becomes zero. Upon movement of the sleeve 69 and the collar 68, the lever 60 is pivoted about the end on the plate 64 side. Therefore, the ring gear 29 is rotated clockwise by the lever 60. Rotation of the ring gear 29 is transmitted to the sun gear 28 through the planetary gears 31, and the sun gear 28 is further rotated exceeding the steering angle of the steering wheel 17. For this reason, the steering input transmitted from the sun gear 28 to the valve input shaft 7a and the torsion bar 8 is larger than the steering amount of the steering wheel 17. Therefore, the steering angle of the front wheels 1a and 1b is increased, as shown in FIG. 10. An equivalent steering gear ratio is changed accordingly, and phase-advancing control for increasing the steering angle of the front wheels in accordance with the rate of change in the power steering hydraulic pressure can be achieved. The hydraulic pressure output from the control valve 100 is generated only when the power steering hydraulic pressure is changed. As shown in FIG. 10, therefore, the phase-advancing control is performed when the steering wheel is further turned, but this control is inhibited while the steering wheel is held unchanged. When the power steering hydraulic pressure is decreased such that the steering wheel is returned from the steered state to the neutral position, the hydraulic pressure output from the control valve 100 is changed in an opposite direction. Accordingly, in this case, the steering angle of the front wheel is decreased in accordance with the rate of change in the power steering hydraulic pressure.

Figure 13:
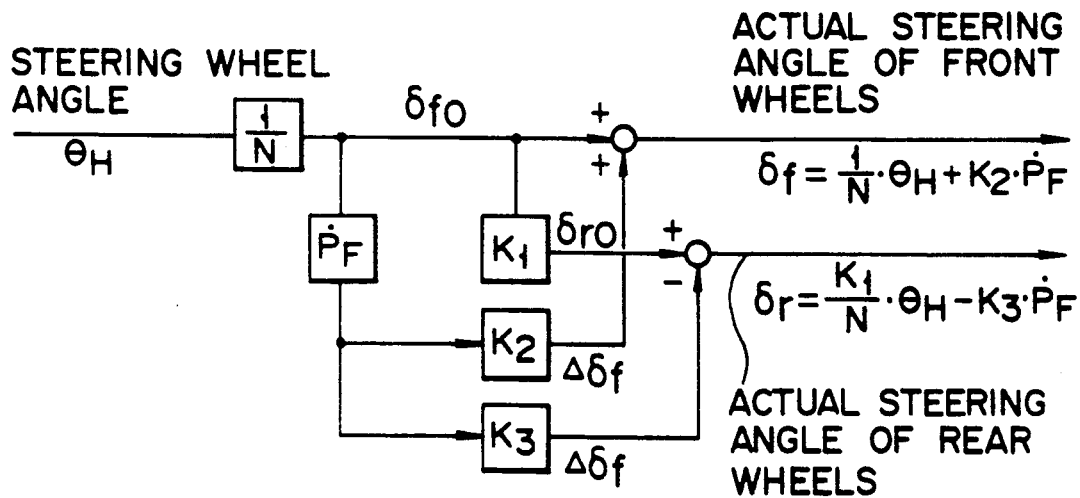

A control system of the above-mentioned four-wheel steering apparatus will be conceptually illustrated with reference to a control block in FIG. 13. With this control system, at the initial period of turning of the vehicle, sharp turning response can be achieved by antiphase and phase-advancing control in accordance with the rate of variation in the hydraulic pressure generated by the power steering unit 6. In the next moment, when the rate of change in the power steering hydraulic pressure is decreased to nullify the pressure difference, original steady four-wheel steering (front-wheel steering by the power steering unit 6, and rear-wheel in-phase steering corresponding to the power steering hydraulic pressure and the vehicle speed) is immediately restored to stabilize the behavior of the vehicle, thereby turning the vehicle. Referring to FIG. 13, reference symbol N denotes a steering ratio; K1, a rear-wheel in-phase coefficient; K2, a front-wheel phase-advancing coefficient; K3, a rear-wheel antiphase coefficient; CK function of a vehicle speed; and PF, rate of change in the power steering hydraulic pressure.

Figure 14:
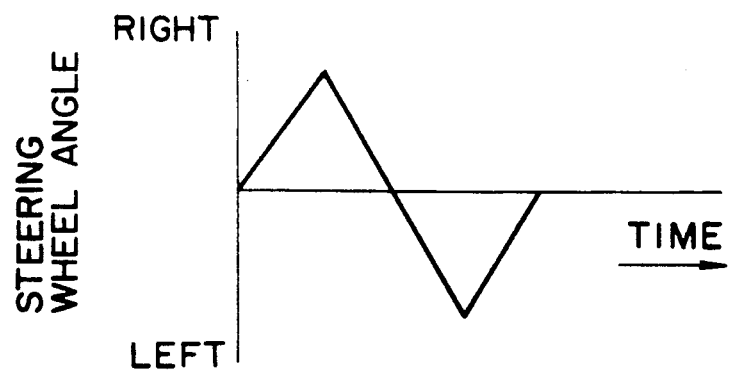

When the steering wheel 17 is returned to the neutral position or is turned counterclockwise, as shown in FIG. 14, the operations opposite to the above operations are performed. Moreover, upon adjusting the pre-load values of the springs 115 and 116 of the control valve 100, when the steering wheel 17 is slowly turned, the hydraulic pressure output for the antiphase control and the phase-advancing is not generated and normal four-wheel steering is performed.

According to the four-wheel steering apparatus of the above embodiment, the in-phase control is performed in accordance with the power steering hydraulic pressure substantially corresponding to the steering force, while the rear-wheel steering angle is decreased and a front-wheel steering angle is increased, in accordance with the rate of variation in the power steering hydraulic pressure, which substantially corresponds to the steering speed. For this reason, the yaw response and the lateral acceleration response of the vehicle can be improved, so that both the steering response and steering stability of the vehicle can be satisfied at a high level. In addition, a slip angle of the center of gravity during turning transition can become be reduced to almost zero, thus improving the turning feel of the vehicle.

Further, the four-wheel steering apparatus can be controlled by only the hydraulic pressure and thus has advantages in high reliability and excellent durability.

In the four-wheel steering apparatus, the output from the in-phase control valve 98 and the output from the antiphase control valve 100 are combined to determine the steering angle of the rear wheels. Accordingly, it is not necessary to output a phase reverse signal for reversing the rear-wheel steering control from the in-phase mode to the antiphase mode. Thus, as compared with a system wherein the phase reverse of the rear wheels is performed by a single control valve, control can be simplified. Further, smooth steering angle control can be performed.

Furthermore, in the apparatus, the output for steering the rear wheels 82a and 82b in phase with the front wheels 1a and 1b and the output for steering the rear wheels 82a and 82b in opposite phase to the front wheels 1a and 1b simultaneously act on the rear power cylinder 90 in the directions opposite to each other to thereby determining the rear-wheel steering angle. Therefore, a high response of phase reverse can be obtained.

Moreover, the in-phase operating means is constituted by a circuit independently of that of the anti-phase operating means. Therefore, a four-wheel steering apparatus capable of steering the rear wheels in the in-phase and antiphase directions can be realized by partially utilizing the conventional in-phase four-wheel steering apparatus.

The four-wheel steering apparatus has failsafe reliability and can perform highly reliable open control. That is, when a failure occurs in the anti-phase steering means, normal in-phase four-wheel steering function is restored. When a failure occurs in the in-phase steering means, the rear wheels 82a and 82b are set in the antiphase steering mode. In this case, there is no danger since the rear wheels are instantaneously (only when the steering angle of the steering wheel 17 varies) steered at a small steering angle.

The present invention is not limited to the first embodiment described above but can be arranged in second to seventh embodiments to be described below.

Figure 15:
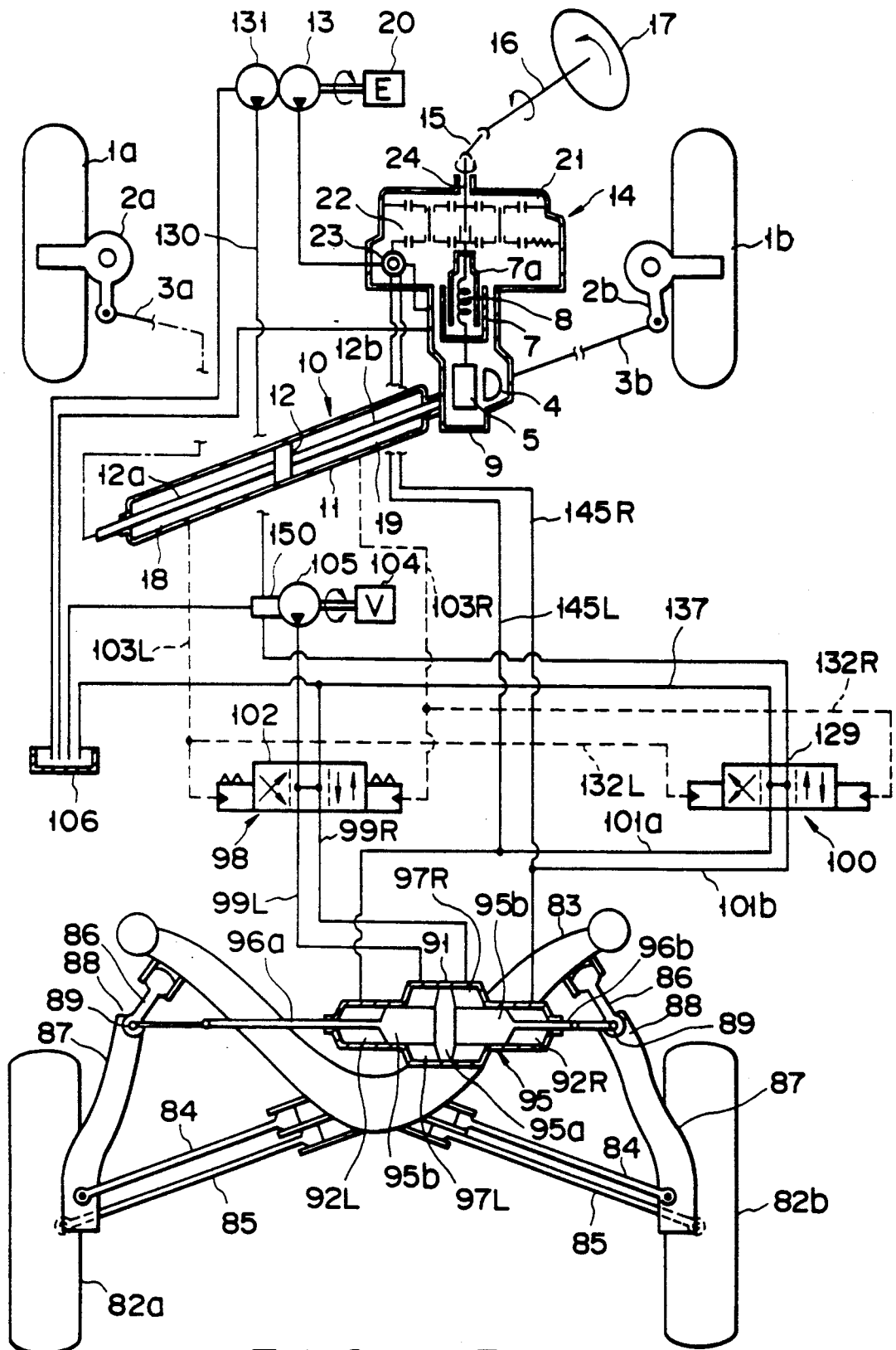
FIG. 15 is a view showing an arrangement of a main part of a second embodiment of the present invention.
Figure 16:
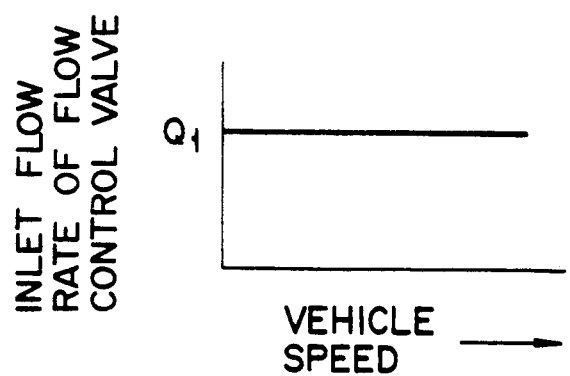
FIG. 16 is a graph showing characteristics at an inlet of a flow control valve.
Figure 17:
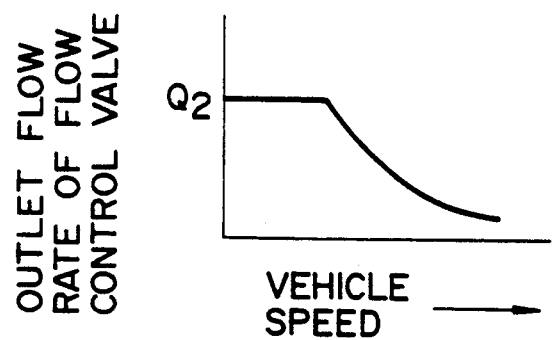
FIG. 17 is a graph showing characteristics at an outlet of the flow control valve.

In the second embodiment shown in FIGS. 15 to 17, hydraulic pressure, which varies in accordance with the vehicle speed, is supplied to the auxiliary control valve 100 without using the variable orifice 141.

More specifically, in place of the variable orifice 141, a fixed orifice or fixed choke (not shown) is arranged in a hydraulic circuit of the control valve 100. On an oil pump 105 is provided a flow control valve 150 for control being a flow rate of the pump 105 in accordance with the pressure difference between the inlet and outlet of an orifice (not shown) arranged in the pump 105. An oil pump 131 driven by the engine is connected to the inlet of the valve 150. The outlet of the valve 150 is connected to a port 129 of the control valve 100. The flow control valve 150 is controlled to decrease the amount of oil, which is supplied from the oil pump 131 at constant flow rate, in accordance with an increase in the vehicle speed, and then supplies the reduced oil to the antiphase control valve 100. FIG. 16 shows flow characteristics at the inlet of the valve 150, and FIG. 17 shows flow characteristics at the outlet of the valve 150.

According to a third embodiment shown in FIGS. 18 to 20, a servo valve 160 of a pressure feedback type is used in place of the control valve 100. The servo valve 160 is electrically controlled by a CPU 161 in accordance with an angular velocity of a steering wheel 17 and the vehicle speed, thereby producing control pressure (pressure difference) necessary for antiphase (phase reverse steering and phase-advancing steering are obtained.

More specifically, the servo valve 160 comprises a servo valve directly driven by a force motor, as shown in FIG. 19. That is, the servo valve 160 comprises a valve body 162 in which a movable spool 163 is slidably held by springs 164. A drive voice coil 164 is arranged on one side of the movable spool 163. A magnet 165 and a yoke 166 are arranged in a space in the valve body 162 to generate a constant magnetic field. When control current is applied to the voice coil 164, a driving force is generated in accordance with the magnitude and direction of the current. This driving force is regulated by a load pressure feedback cylinder 167 to balance with the load pressure. A sleeve 168 is arranged around the movable spool 163 to constitute a four-way valve for controlling the pressure and the flow rate in accordance with displacement of the spool 163. An oil pump 131 of a constant flow rate type is connected to a central groove of the sleeve 168, and oil paths 101L and 101R are respectively connected to actuator ports 169 and 170 formed in the valve body 162. Grooves on both sides of the center of the sleeve are connected to a reservoir tank 106.

To the CPU 161 are connected a sensor 171, detecting annular velocity of the steering wheel, arranged on a column shaft 16 of the steering wheel 17 and a sensor 172 for detecting the vehicle speed. An output side of the CPU 161 is connected to the servo valve 160. Current necessary for phase reverse and phase-advancement is output from the CPU 161 in accordance with various input signals such as angular velocity signals detected by sensor 171 and vehicle velocity signals detected by the sensor 172, thereby controlling the pressure difference between actuator ports 169 and 170 as in the first embodiment. FIG. 20 shows the relationship between the pressure difference $\Delta P$ and the current i.

A relief valve 200 and a pressure switch 202 are arranged in a hydraulic circuit between the servo valve 160 and the oil pump 131. A pressure switch 201 is arranged at the delivery portion of an oil pump 105. These elements are connected to the CPU 161. When abnormal pressure is detected by the pressure switches 201 and 202 (e.g., hydraulic failure of the in-phase system and hydraulic abnormality of the auxiliary steering system), a signal for the relief valve 200 is disabled in accordance with a command from the CPU 161 so as to interrupt supply of compressed oil to the servo valve 160, thereby switching the apparatus to the normal in-phase four-wheel steering mode.

Figure 21:
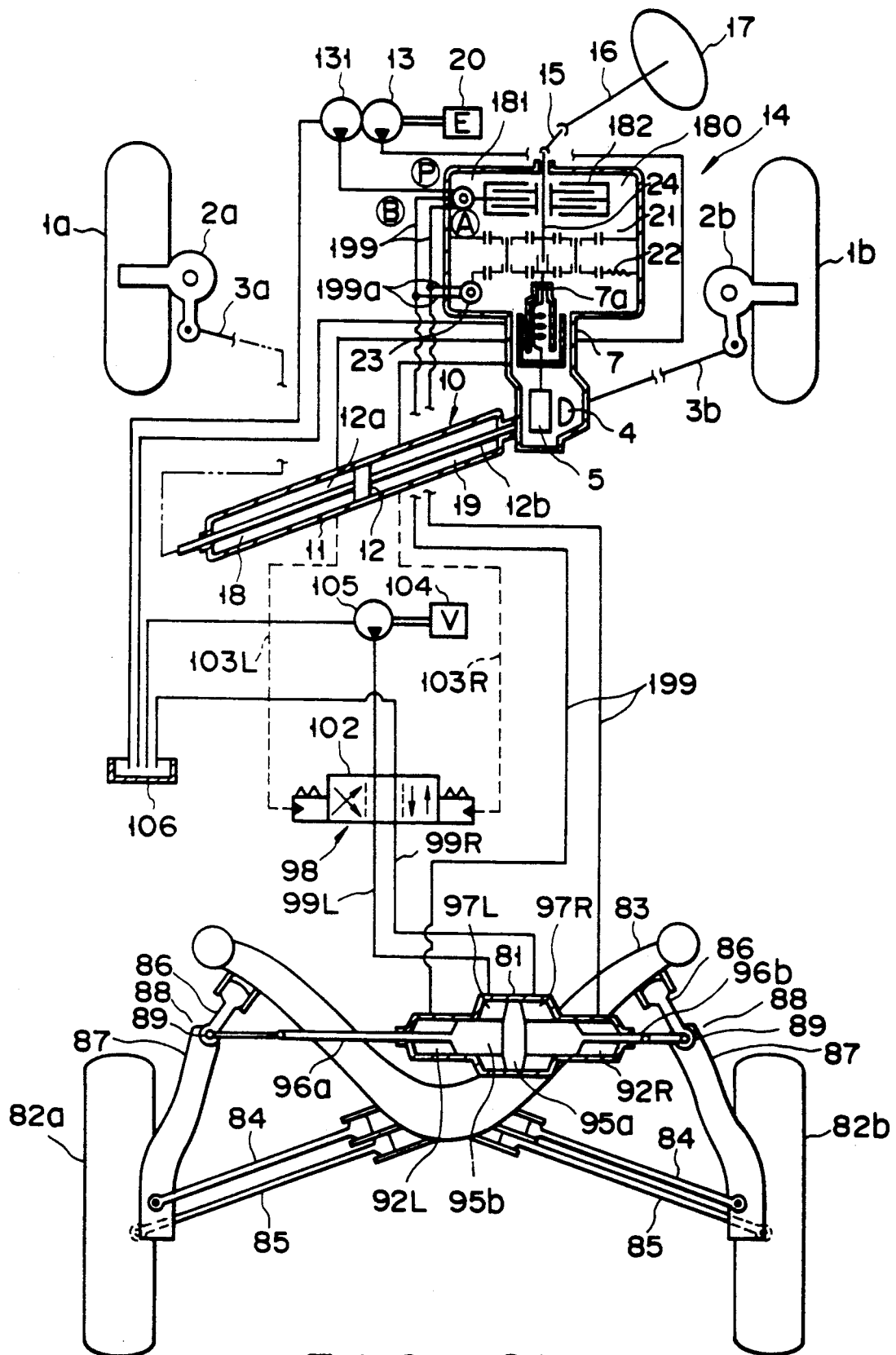
FIG. 21 is a view showing a main part according to a fourth embodiment of the present invention.
Figure 22:
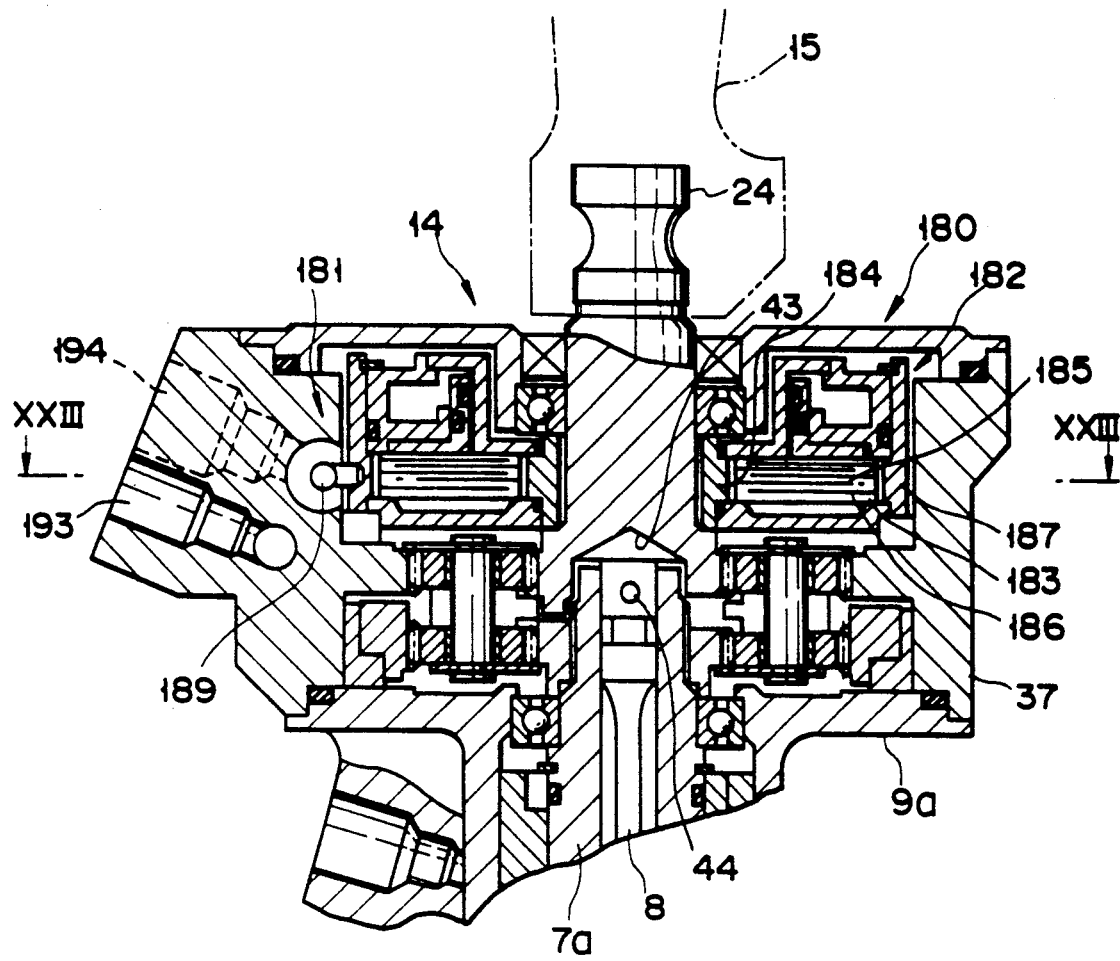
FIG. 22 is a sectional view showing a structure of a steering sensor.
Figure 23:
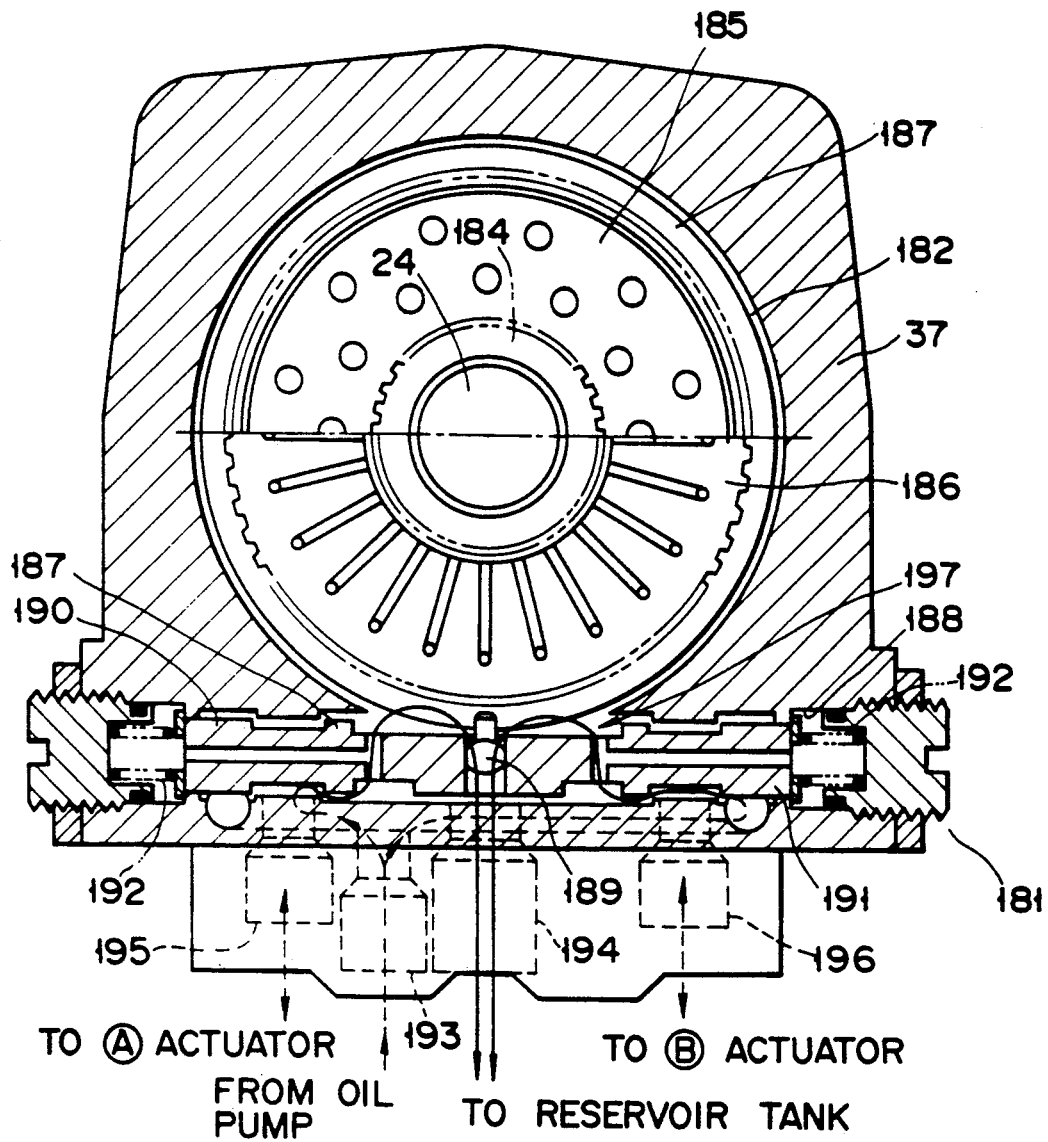
FIG. 23 is a sectional view of the steering sensor taken along line XXIII—XXIII in FIG. 22.

In a fourth embodiment shown in FIGS. 21 to 23, a mechanical steering sensor 180 for detecting the steering angular velocity is arranged on an input shaft 24 of a phase-advancing mechanism 14, and a steering sensor valve 181 is arranged in the sensor 180, thereby obtaining control pressure required for the phase reverse and phase-advancement.

More specifically, the steering sensor 180 has a viscous coupling (viscous clutch) 182 which is mounted on the periphery of the input shaft 24 and whose inner circumferential side is an input side and outer circumferential side is an output side, as shown in FIG. 22. When the steering wheel 17 is turned, rotational torque corresponding to the steering angular velocity of the steering wheel is output from an outer case 187 of the viscous coupling 182 through an inner case 184 and a plurality of input/output plates 185 and 186 (clutch plates), in accordance with the viscous resistance of silicone oil 183 filled in the case.

As shown in FIG. 22 and 23, the steering sensor valve 181 includes an elongated valve chamber 188 which extends in a direction perpendicular to the axis of the viscous coupling 182 and is formed in the wall portion of the case 37 of the phase-advancing mechanism 14 adjacent to the viscous coupling 182. Part of the central portion of the valve chamber 188 faces the outer circumferential surface of the outer case 187 of the viscous coupling 182, and a pin 189 is fitted into one position on the outer circumferential surface of the outer case 187. A pair of pistons 190 and 191 are slidable in the valve chamber 188 so as to interpose the pin 189 therebetween. The pistons 190 and 191 are biased by a pair of springs 192 toward the pin. Grooves 197 are formed on the pistons 190 and 191. These grooves cause an oil supply port 193 formed in the case 37 to communicate with a reservoir port 194 formed in the case when the viscous coupling 182 is not displaced. When the pistons 190 and 191 are gradually displaced, the grooves inhibit communication between the ports 193 and 194 and open/close left and right actuator ports 195 and 196. Therefore, control pressure according to a steering direction and a steering angular velocity of the steering wheel is produced from the ports 195 and 196.

The oil supply port 193 is connected to an oil pump 131 of a constant flow rate type. The actuator ports 195 and 196 are connected to cylinder chambers 92a and 92b of a rear power cylinder 90 through oil supply paths 199. Intermediate portions of the oil supply paths 199 are connected to plugs 54 and 56 of the phase-advancing mechanism 14 through branch paths 199a, respectively. Thus, the control pressure produced in accordance with the steering direction and the steering angular velocity is supplied as phase-advancing pressure and antiphase pressure to the phase-advancing mechanism 14 and the rear power cylinder 90. In this embodiment, an oil pump 13 for a power steering unit is directly connected to a rotary valve 7.

Figure 24:
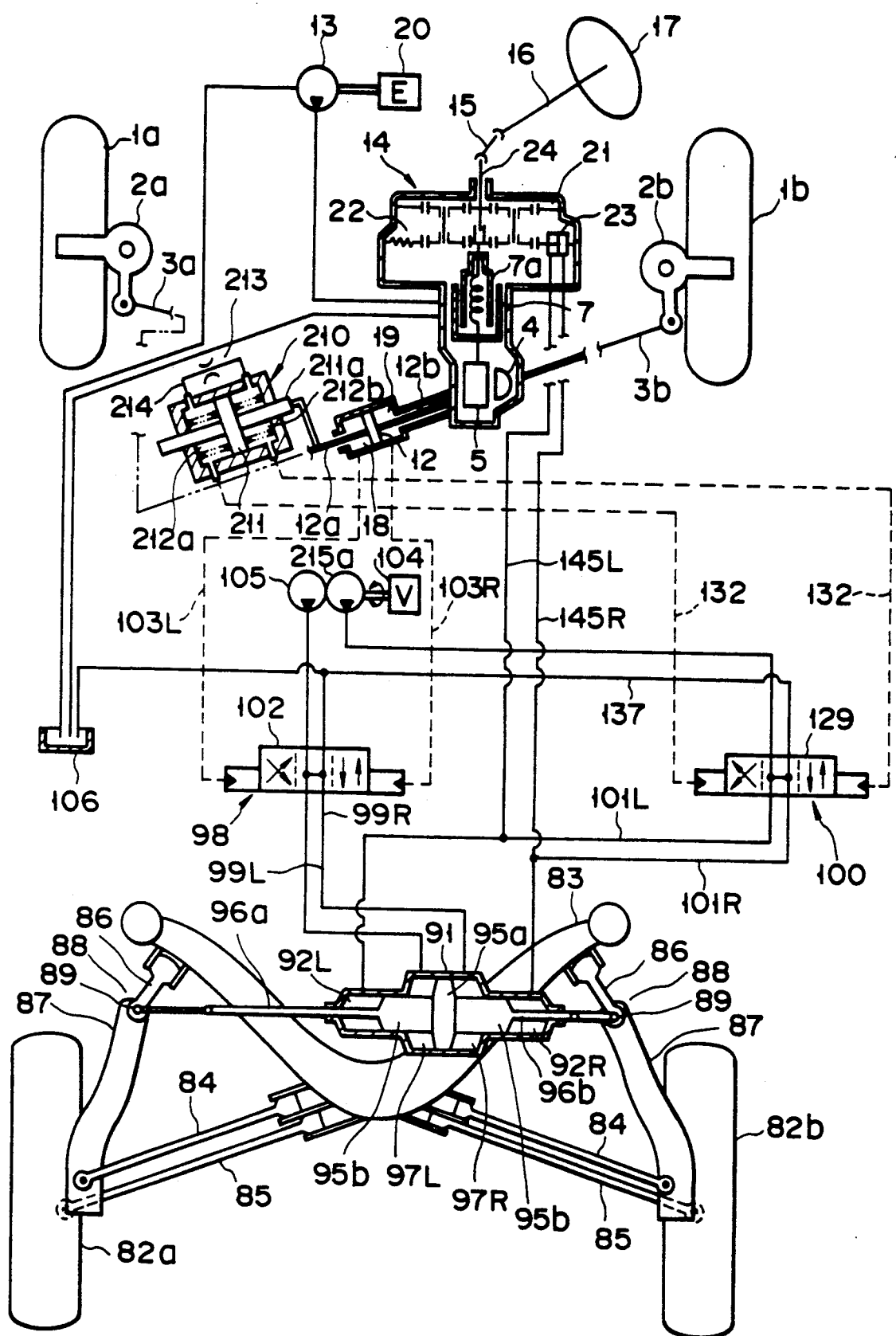
FIG. 24 is a view showing a main part according to a fifth embodiment of the present invention.
Figure 25:
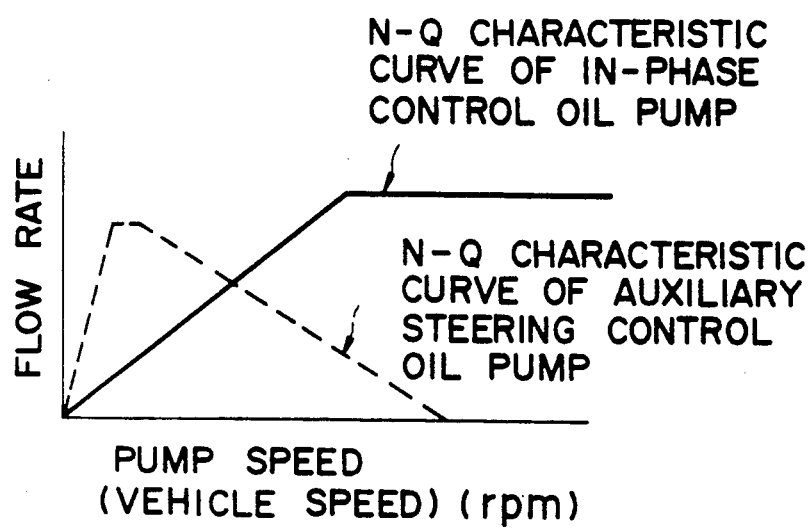
FIG. 25 is a graph showing characteristics of a hydraulic pressure supplied to a phase control valve.

In a fifth embodiment shown in FIGS. 24 and 25, a four-wheel steering apparatus comprises a dashpot 210 operated together with a piston 12 of a power steering unit 6, and an auxiliary steering control valve 100 using a valve which has the same structure as that of the in-phase control valve, thereby generating control pressure in accordance with to a steering wheel angular velocity and the vehicle speed.

More specifically, a rod 211a of a piston 211 of the dashpot 210 is connected to a piston rod 12a of the power steering unit 6. Chambers 212a and 212b defined on both sides of the piston 211 communicate with each other through a communicating path 214 having a fixed orifice 213. Therefore, the pressure difference corresponding to the steering wheel angular velocity is produced from the chambers 212a and 212b of the dashpot 210. The chambers 212a and 212b are connected to pilot pressure chambers defined on both sides of the spool of the control valve 100, respectively. An oil pump 215a driven by a differential unit 104 is connected to an oil pump 105. The oil pump 215a has characteristics wherein a flow rate is decreased with an increase in vehicle speed, as indicated by a broken line in FIG. 25. The delivery side of the oil pump 215a is connected to a pump port of the control valve 100 to generate hydraulic pressure corresponding to the steering wheel angular velocity and the vehicle speed from the control valve 100. The hydraulic pressure is supplied to cylinder chamber 92L and 92R of a rear power cylinder 90. In this embodiment, only an oil pump 13 for the power steering unit is driven by a engine 20.

A sixth embodiment shown in FIG. 26 is a modification of the fifth embodiment. In this embodiment, hydraulic pressure generated in chambers 18 and 19 of a power steering unit 6 are supplied to chambers 212a and 212b of a dashpot 210, thereby producing hydraulic pressure according to the rate of change in the hydraulic pressure from the power steering unit and the vehicle speed. An oil replenishing circuit constituted by an oil replenishing path 216 is arranged in a communication path 214 so as to prevent a chamber opposite to the chamber associated with movement of a piston 211 of the dashpot from being set in negative pressure. The oil replenishing path 216 has two check valves 215 and communicates with a reservoir tank 106.

A seventh embodiment shown in FIG. 27 is a modification of the sixth embodiment. A variable orifice 217 is used in place of the fixed orifice 213 of the dashpot 210. A pressure generator 218 responsive to the vehicle speed, having the same structure as that in the first embodiment, is arranged in an oil pump 105 driven by a differential unit 104 or a hydraulic circuit for the pump 105, so that the throttle amount of the variable orifice 217 can be controlled by pilot pressure or the pressure difference between the inlet and outlet of the fixed orifice in accordance with the vehicle speed.

In the second to seventh embodiments, the same reference numerals as in the first embodiment denote the same parts, and detailed description thereof has been omitted.

What is claimed is:

1. A four-wheel steering apparatus for a vehicle having steerable front and rear wheels, comprising:
    in-phase steering control means for generating hydraulic output for steering the rear wheels in the same direction as that of the front wheels in accordance with a steering state of the front wheels;
    antiphase steering control means, arranged in parallel to said in-phase steering control means, for generating hydraulic output for steering the rear wheels in a direction opposite to a direction in which the steering state of the front wheels changes, in accordance with a rate of change in the steering state of the front wheels; and
    a hydraulic actuator receiving the hydraulic output from the in-phase steering control means to generate a steering force for steering the rear wheels in the same direction as that of the front wheels, receiving the hydraulic output from the antiphase steering control means to generate a steering force for steering the rear wheels in a direction opposite to a direction in which the steering state of the front wheels changes, and steering the rear wheels in accordance with a composite force of the steering forces.

2. An apparatus according to claim 1, wherein said hydraulic actuator includes piston means, connected to the rear wheels, for receiving the hydraulic outputs in opposite directions from said in-phase and antiphase steering control means and actuating in response to a difference between the hydraulic outputs.

3. A four-wheel steering apparatus for a vehicle having steerable front and rear wheels, comprising:
    in-phase steering control means for generating hydraulic output for steering the rear wheels in the same direction as that of the front wheels in accordance with a steering state of the front wheels;
    antiphase steering control means, arranged in parallel to said in-phase steering control means, for generating hydraulic output for steering the rear wheels in a direction opposite to a direction in which the steering state of the front wheels changes, in accordance with a rate of change in the steering state of the front wheels; and
    a hydraulic actuator including a pair of first hydraulic chambers for receiving the hydraulic output from said in-phase steering control means to generate a steering force for steering the rear wheels in the same direction as that of the front wheels and a pair of second hydraulic chambers for receiving the hydraulic output from said antiphase steering control means to generate a steering force for steering the rear wheel in a direction opposite to a direction in which the steering state of the front wheels changes, for steering the rear wheels in accordance with a composite force of the steering forces.

4. An apparatus according to claim 3, wherein a sectional area of each of said second hydraulic chambers is smaller than that of said first hydraulic chambers.

5. An apparatus according to claim 4, wherein said hydraulic actuator includes a cylinder having a large-diameter portion and small-diameter portions located on both sides of the large-diameter portion, and a piston having first piston portion slidably arranged in the large-diameter portion and a pair of second piston portions slidably arranged in the small-diameter portions, respectively, said first hydraulic chambers are defined on both sides of the first piston portion in the large-diameter portion, and said second hydraulic chambers are defined on both sides of the second piston portions in the small-diameter portions.

6. An apparatus according to claim 1, which further comprises power steering means for producing hydraulic pressure in accordance with a steering operation and assisting steering of the front wheels in accordance with the produced hydraulic pressure, and wherein said antiphase steering control means comprises means for increasing the hydraulic output in accordance with an increase in a rate of change in the hydraulic pressure produced by said power steering means.

7. An apparatus according to claim 1, which further comprises power steering means for generating hydraulic pressure in accordance with a steering operation and for assisting steering of the front wheels in accordance with the produced hydraulic pressure, and wherein said in-phase steering control means includes means for increasing the hydraulic output in accordance with an increase in the hydraulic pressure produced by said power steering means.

8. An apparatus according to claim 1, wherein said antiphase steering control means comprises means for decreasing the hydraulic output in accordance with an increase in the vehicle speed of the vehicle.

9. An apparatus according to claim 1, wherein said in-phase steering control means comprises means for increasing the hydraulic output in accordance with an increase in the vehicle speed of the vehicle.

10. An apparatus according to claim 1, wherein said in-phase and antiphase steering control means comprise means for increasing a ratio of the hydraulic output from said in-phase steering control means to the hydraulic output from said antiphase steering control means in accordance with an increase in the vehicle speed of the vehicle.

11. An apparatus according to claim 1, which further comprises:
power steering means for producing hydraulic pressure in accordance with a steering operation and for assisting steering of the front wheels in accordance with the produced hydraulic pressure, and
wherein said in-phase steering control means comprises:
pump means for delivering an amount of oil corresponding to the vehicle speed of the vehicle; and
spool valve means, having a spool being arranged to receive the hydraulic pressure produced by said power steering means as pilot pressure and being displaced by the pilot pressure, for controlling a magnitude of the hydraulic output in accordance with a displacement of said spool and the amount of oil supplied from said pump means.

12. An apparatus according to claim 1, which further comprises:
power steering means for producing hydraulic pressure in accordance with a steering operation and assisting steering of the front wheels in accordance with the produced hydraulic pressure, and
wherein said antiphase steering control means comprises:
oil pump means for supplying predetermined hydraulic pressure; and
control valve means including a first valve element which receives as pilot pressure the hydraulic pressure produced by said power steering means and is displaced by the pilot pressure, a second valve element, biasing means for biasing said second valve element so as to follow said first valve element, a pair of pressure chambers whose volumes are changed in accordance with the displacement of said second valve element, a communication path communicating with said pair of pressure chambers, and variable throttle means which is arranged in said communication path and a throttle amount of which is reduced in accordance with an increase in the vehicle speed of the vehicle, said control valve means receiving the hydraulic pressure from said oil pump means and producing hydraulic pressure corresponding to a relative displacement between said first and second valve elements.

13. An apparatus according to claim 1, which further comprises phase-advancing steering means for increasing a steering angle of the front wheels in accordance with the hydraulic output from said antiphase steering control means.

14. An apparatus according to claim 13, which further comprises:
a steering wheel for steering the front wheels, and
power steering means for producing hydraulic pressure in accordance with the steering operation of said steering wheel and assisting steering of the front wheels in accordance with the produced hydraulic pressure, and
wherein said phase-advancing steering means is arranged between said steering wheel and said power steering means.

15. An apparatus according to claim 13, which further comprises:
a steering wheel for steering the front wheels, and
wherein said phase-advancing steering means comprises:
a first planetary gear mechanism including a first sun gear rotated together with said steering wheel, a first ring gear arranged around said sun gear, and a plurality of first planetary gears meshed between said first sun gear and said first ring gear;
a second planetary gear mechanism including a plurality of second planetary gears rotated together with said first planetary gears, a second sun gear meshed with said second planetary gears to transmit rotation as a steering force to the front wheels, and a second ring gear meshed with said second planetary gears, one of said first and second ring gears being held immovably and the other of said first and second ring gears being rotatably supported; and
actuator means for rotating said other of said first and second ring gears to change a gear ratio of said phase-advancing steering means.

16. An apparatus according to claim 15, wherein said actuator means comprises a first valve element for receiving the hydraulic output from said antiphase steering control means as pilot pressure and displacing upon reception of the pilot pressure, a second valve element coupled to said other ring gear and displaceable relative to said first valve element, and means for applying hydraulic pressure on said second valve element so as to cause said second valve element to follow displacement of said first valve element in accordance with relative displacement between said first and second valve elements.

17. An apparatus according to claim 1, wherein said antiphase steering control means comprises means for generating the hydraulic output in accordance with a steering speed of the front wheels.

18. An apparatus according to claim 1, which further comprises:
   power steering means for producing hydraulic pressure in accordance with a steering operation and assisting steering of the front wheels in accordance with the produced hydraulic pressure, and
   wherein said in-phase steering control means comprises means for receiving the hydraulic pressure produced by said power steering means as pilot pressure to control the hydraulic output, and
   said antiphase steering control means comprises means for detecting the steering speed of the front wheels and means for electronically controlling the hydraulic output in accordance with a signal from said detecting means.

19. An apparatus according to claim 1, which further comprises:
   a steering wheel, and
   a front-wheel steering mechanism for steering the front wheels in accordance with an operation of said steering wheel, and
   wherein said antiphase steering control means comprises:
   viscous coupling means having an input portion coupled to said front-wheel steering mechanism and rotated together therewith, and an output portion rotated upon rotation of said input portion; and
   valve means, connected to said output portion of said viscous coupling means, for controlling the hydraulic output in accordance with rotation of said output portion.

20. An apparatus according to claim 1, wherein said antiphase steering control means comprises: a pressure cylinder having a pair of pressure chambers whose volumes are changed in accordance with steering of the front wheels, and means for causing said pair of pressure chambers to communicate with each other through a throttle; and control valve means for controlling the hydraulic output in accordance with pressure difference between said pair of pressure chambers.

21. An apparatus according to claim 20, wherein said throttle is a variable throttle whose throttle amount is decreased in accordance with an increase in the vehicle speed of the vehicle.

22. A four-wheel steering apparatus for a vehicle having steerable front and rear wheels, comprising:
   power steering means for producing hydraulic pressure in accordance with a steering operation and assisting steering of the front wheels in accordance with the produced hydraulic pressure;
   first and second hydraulic sources;
   in-phase steering control means, connected to said first hydraulic source and said power steering means, for outputting, in accordance with the hydraulic pressure produced by the power steering means, hydraulic pressure supplied from said first hydraulic source as first hydraulic output for steering the rear wheels in phase with the front wheels;
   antiphase steering control means, connected to said second hydraulic source and said power steering means, for outputting, in accordance with a rate of change in the hydraulic pressure produced by said power steering means, hydraulic pressure supplied from said second hydraulic source as second hydraulic output for steering the rear wheels in opposite phase to the front wheels; and
   a hydraulic actuator, connected to said in-phase and antiphase steering control means, for combining the first and second hydraulic outputs and steering the rear wheels in accordance with the difference between the first and second hydraulic outputs.

23. A four-wheel steering apparatus for a vehicle having steerable front and rear wheels, comprising:
   first and second hydraulic sources;
   a first hydraulic actuator for steering the rear wheels;
   a second hydraulic actuator for steering the rear wheels;
   in-phase steering control valve means, arranged between said first hydraulic source and said first hydraulic actuator, for guiding hydraulic pressure from said first hydraulic source to said first hydraulic actuator to steer the rear wheels in phase with the front wheels in accordance with a steering state of the front wheels; and
   antiphase steering control valve means, arranged between said second hydraulic source and said second hydraulic actuator, for guiding hydraulic pressure from said second hydraulic source to said second hydraulic actuator to steer the rear wheels in opposite phase to the front wheels in accordance with a rate of change in the steering state of the front wheels.

24. A four-wheel steering apparatus for a vehicle having steerable front and rear wheels, comprising:
   first and second hydraulic sources;
   a first hydraulic actuator for steering the rear wheels;
   a second hydraulic actuator for steering the rear wheels;
   steering gear ratio variable control means for correcting a steering angle of the front wheels;
   in-phase steering control valve means, arranged between said first hydraulic source and said first hydraulic actuator, for guiding hydraulic pressure from said first hydraulic source to said first hydraulic actuator to steer the rear wheels in phase with the front wheels in accordance with a steering state of the front wheels; and
   antiphase steering control valve means, arranged between said second hydraulic source and said second hydraulic actuator and between said second hydraulic source and said steering gear ratio variable control means, for guiding hydraulic pressure from said second hydraulic source to said second hydraulic actuator and said variable control means to steer the rear wheels in opposite phase to the front wheels in accordance with a rate of change in the steering state of the front wheels and to increase the steering angle of the front wheels.

* * * * *

UNITED STATES PATENT AND TRADEMARK OFFICE
CERTIFICATE OF CORRECTION

PATENT NO. : 5,147,008
DATED : September 15, 1992
INVENTOR(S) : Nishimori et al.

It is certified that error appears in the above-identified patent and that said Letters Patent is hereby corrected as shown below:

Please correct the spelling of the name of the inventor appearing in the title on page 1, line 2 from "Nishimore et al." to read --Nishimori et al.--

Please correct the spelling of the first named inventor appearing under the heading "Inventors:" on the Title page from "Nishimore" to read --Nishimori--.

Signed and Sealed this

Twelfth Day of October, 1993

Attest:

BRUCE LEHMAN

Attesting Officer            Commissioner of Patents and Trademarks